(12) United States Patent
Tanaka et al.

(10) Patent No.: US 9,115,026 B2
(45) Date of Patent: Aug. 25, 2015

(54) CEMENTITIOUS MATRIX AND FIBER REINFORCED CEMENT BASED MIXTURE

(71) Applicant: TAISEI CORPORATION, Tokyo (JP)

(72) Inventors: Yoshihiro Tanaka, Hino (JP); Jun Sakamoto, Tokyo (JP); Osamu Hashimoto, Tokyo (JP)

(73) Assignee: TAISEI CORPORATION, Tokyo (JP)

( * ) Notice: Subject to any disclaimer, the term of this patent is extended or adjusted under 35 U.S.C. 154(b) by 0 days.

(21) Appl. No.: 14/404,234

(22) PCT Filed: Aug. 19, 2013

(86) PCT No.: PCT/JP2013/072085
§ 371 (c)(1),
(2) Date: Nov. 26, 2014

(87) PCT Pub. No.: WO2014/030610
PCT Pub. Date: Feb. 27, 2014

(65) Prior Publication Data
US 2015/0166414 A1    Jun. 18, 2015

(30) Foreign Application Priority Data

Aug. 21, 2012    (JP) .............................. 2012-182080

(51) Int. Cl.
| | | |
|---|---|---|
| *C04B 28/04* | (2006.01) | |
| *C04B 14/28* | (2006.01) | |
| *C04B 14/18* | (2006.01) | |
| *C04B 18/08* | (2006.01) | |
| *C04B 18/14* | (2006.01) | |
| *C04B 20/00* | (2006.01) | |
| *C04B 22/06* | (2006.01) | |
| *C04B 28/02* | (2006.01) | |
| *C04B 28/08* | (2006.01) | |

(52) U.S. Cl.
CPC ............. *C04B 28/04* (2013.01); *C04B 28/021* (2013.01); *C04B 28/08* (2013.01)

(58) Field of Classification Search
CPC .......... C04B 7/02; C04B 7/14; C04B 7/147; C04B 14/06; C04B 14/062; C04B 14/28; C04B 14/38; C04B 18/08; C04B 18/141; C04B 18/146; C04B 20/00; C04B 22/00; C04B 28/04; C04B 28/08
USPC .................. 106/705, 706, 707, 709, 711, 714
See application file for complete search history.

(56) References Cited

U.S. PATENT DOCUMENTS

| | | | |
|---|---|---|---|
| 5,503,670 A | | 4/1996 | Richard et al. |
| 6,723,162 B1 | | 4/2004 | Cheyrezy et al. |
| 7,465,350 B2 * | | 12/2008 | Uzawa et al. .................. 106/640 |
| 2004/0247846 A1 | | 12/2004 | Uzawa et al. |
| 2008/0066654 A1 * | | 3/2008 | Fraser ........................... 106/709 |
| 2008/0163794 A1 | | 7/2008 | Tanaka et al. |
| 2009/0071378 A1 | | 3/2009 | Watanabe et al. |
| 2012/0041087 A1 * | | 2/2012 | Yastremskiy et al. ........... 521/83 |
| 2013/0213274 A1 * | | 8/2013 | Iriya et al. ....................... 106/707 |
| 2014/0283711 A1 * | | 9/2014 | Guerra Barrena et al. ..... 106/708 |

FOREIGN PATENT DOCUMENTS

| | | | | |
|---|---|---|---|---|
| EP | 1 080 049 B1 | | 3/2001 | |
| JP | 8-26793 A | | 1/1996 | |
| JP | 8-239249 A | | 9/1996 | |
| JP | 9-500352 A | | 1/1997 | |
| JP | 11-209159 A | | 8/1999 | |
| JP | 2000-072518 A | | 3/2000 | |
| JP | 2001-181004 A | | 7/2001 | |
| JP | 2002-47050 A | * | 2/2002 | .............. C04B 28/04 |
| JP | 2002-137952 A | | 5/2002 | |
| JP | 2002-514567 A | | 5/2002 | |
| JP | 2002-338323 A | | 11/2002 | |
| JP | 2002-348166 A | | 12/2002 | |
| JP | 2006-213550 A | | 8/2006 | |
| JP | 2006-219333 A | | 8/2006 | |
| JP | 2006-298679 A | | 11/2006 | |
| JP | 2007-119257 A | | 5/2007 | |
| JP | 2007-119291 A | | 5/2007 | |
| JP | 2009-84095 A | | 4/2009 | |
| JP | 2009-227549 A | | 10/2009 | |
| JP | 2011-6321 A | * | 1/2011 | .............. C04B 18/06 |
| JP | 2011-042534 A | | 3/2011 | |
| WO | WO 99/58468 A1 | | 11/1999 | |
| WO | WO 2011/142003 A1 | | 11/2011 | |

OTHER PUBLICATIONS

Derwent-Acc-No. 2011-C54917, abstract of Korean Patent Specification No. KR 2011019959 A (Mar. 2011).*
Derwent-Acc-No. 2012-D50243, abstract of Korean Patent Specification No. KR 1111634 B1 (Mar. 2012).*
Derwent-Acc-No. 2012-D50242, abstract of Korean Patent Specification No. KR 1111635 B1 (Mar. 2012).*
Derwent-Acc-No. 2012-M17772, abstract of Korean Patent Specification No. KR 1182808 B1 (Sep. 2012).*

* cited by examiner

*Primary Examiner* — Anthony J Green
(74) *Attorney, Agent, or Firm* — Dickstein Shapiro LLP (57) ABSTRACT

A cementitious matrix in which the development of early strength is fast, the hydration heat temperature is small, and the amount of shrinkage during curing is small, while keeping the fluidity when concrete is fresh, is provided. The cementitious matrix is characterized by comprising 100 parts by weight of Portland cement, 5 to 30 parts by weight of silica fume, 5 to 25 parts by weight of limestone powder, 30 to 80 parts by weight of at least one of ground blast furnace slag or fly ash, at least one chemical admixture, water, and 70 to 150 parts by weight of aggregate having a largest aggregate diameter of 1.2 to 3.5 mm.

20 Claims, 1 Drawing Sheet

CEMENTITIOUS MATRIX AND FIBER REINFORCED CEMENT BASED MIXTURE

BACKGROUND

1. Technical Field

The present invention relates to a cementitious matrix having high strength and containing no coarse aggregate, and a fiber reinforced cement based mixture.

2. Background Art

Conventional concrete ranges from normal concrete used for civil engineering and architectural constructions to high-fluidity concrete, high-strength concrete, mass concrete, underwater concrete, and the like according to the intended use, and is basically a material intended to be reinforced with reinforcing steel bars. Nowadays, however, there is a tendency to employ so-called fiber reinforced concrete (hereinafter, sometimes abbreviated to "FRC") in which short fibers are incorporated into the conventional concrete for the purpose of supplementing steel bar reinforcement, preventing corner defects of members, and preventing cracking due to drying shrinkage.

The aggregates mixed in these concretes are composed of a fine aggregate and a coarse aggregate. In conventional concrete, a unit weight of aggregate contained in a unit volume of concrete is larger than a unit weight of powder (=unit weight of cement+unit weight of mineral admixture). For example, the ratio of the unit weight of aggregate to the unit weight of powder is given by 400 to 700% for the concrete that is most commonly used. It is about 250 to 300% even for the powder-type high-fluidity concrete containing a large amount of powder.

Moreover, the largest particle diameter of coarse aggregate used for conventional concrete is limited most frequently to 20 mm or 25 mm in the case of applying to general structures, and limited to 40 mm or 80 mm in the case of applying to dams and the like. Therefore, in conventional fiber reinforced concrete, the bonding mechanism between fibers and concrete does not rely on the mechanical bond through the aggregate mixed in the concrete but relies on the chemical adhesion and frictional force between concrete hydrate (cement paste) and fibers.

On the other hand, ultra-high-strength fiber reinforced concrete (hereinafter, sometimes abbreviated to "UFC") that is obtained by mixing reinforcing fibers such as metallic fibers or organic fibers into a cementitious matrix obtained by mixing cement and pozzolanic reaction particles (pozzolanic material) into aggregate having a largest aggregate particle diameter of about 1 to 2 mm is known.

UFC has such a characteristic that it can secure a certain level of tensile strength and toughness even after development of a crack, by combining fibers having high tensile strength with a cementitious matrix being dense and having ultra-high strength. Specifically, this has been considered to be due to the exertion of a so-called bridging effect in which the fibers cover tensile force instead of the cementitious matrix when a crack is developed in the cementitious matrix as a result of the exertion of the tensile stress on the materials.

For this reason, unlike the conventional reinforced concrete, UFC does not require reinforcement with reinforcing steel bars. Moreover, concrete structures built using UFC can achieve the reduction in the thickness and the weight of the members.

On the other hand, by performing the high temperature heat curing to UFC at 80° C. to 90° C., the hydration reaction of cement, and a binder such as a pozzolanic material including silica fume, fly ash, ground blast furnace slag, and the like, which are contained in a cementitious matrix, can be completed efficiently, and in a short time, therefore, UFC is frequently subjected to heat curing.

Moreover, UFC can achieve significant improvement in the durability because denser hydrated cement particles are developed in a short time through a hydration process when the cementitious matrix is subjected to heat curing as compared with the case of the controlled normal temperature curing. Further, after the heat curing, UFC has a characteristic that drying shrinkage becomes almost zero, a creep coefficient is significantly decreased, and the like (see Patent Documents 5 to 11, and the like).

Patent Document 1 discloses that by mixing an inorganic mineral admixture composed of at least one kind of blast furnace slag, fly ash, or limestone powder into a cementitious composition of low-heat Portland cement and silica fume, a high-strength concrete excellent in the fluidity, the workability, and the strength development can be obtained at a water-cement ratio of about 12 to 30%. However, as to the inorganic mineral admixture disclosed in Examples, there are only the cases where one kind of inorganic mineral admixture is applied, and the effects of the combination of these inorganic mineral admixtures are neither described nor suggested.

On the other hand, Patent Document 2 relates to a cementitious matrix for high-fluidity spraying concrete, and discloses that one or more kinds of auxiliary powders selected from limestone powder, silica stone powder, blast furnace slag, or fly ash are added into a mixture of Portland cement and silica fume. In this document, the Examples or effects of the combination of the limestone powder with another auxiliary powder are neither described nor suggested. Further, as the effect disclosed in Patent Document 2, the reduction of a rebound ratio is only disclosed.

Each of the cementitious compositions disclosed in Patent Documents 3 and 4 has almost the same configuration as each other except for the type of cement. The difference between the two is that while the type of cement of the cementitious composition is ordinary Portland cement in Patent Document 3, the type of cement of the cementitious composition is high belite-based Portland cement in Patent Document 4. These documents disclose the effect of improving fluidity, and the reduction effect of the amount of high-range water-reducing agent that is required to obtain a certain level of fluidity of concrete, by using a cementitious composition in which each of the cement, the silica fume, and the limestone powder having a specific grading distribution is contained in an amount of specified parts by weight. Further, Patent Documents 3 and 4 disclose the effects of fluidity in the mortar and concrete in which a cementitious composition containing cement, silica fume, and limestone powder is applied, however, the Examples or effects of the combination of the cementitious composition described above with ground blast furnace slag or fly ash are neither described nor suggested. In addition, there is also no disclosure of the strength development, the shrinkage associated with cement hydration, and the effects relating to hydration heat.

Both Patent Documents 5 and 6 are the documents relating to ultra-high-strength fiber reinforced concrete. The fibers contained in a latent hydraulicity composition of Patent Document 5 are organic fibers or carbon fibers, while the fibers in Patent Document 6 are metallic fibers, and thus these Patent Documents are different in terms of fibers, but are common in the cementitious matrix. The cementitous matrices disclosed in these documents are each composed of cement, fine particles such as silica fume, and two kinds of inorganic particles A and B, in which a specific surface area and a mix proportion by weight are specified to each of the materials. Inorganic particles A and inorganic particles B are characterized in that the ranges of the specific surface area are different from each other, and examples of the material applicable to these inorganic particles A and B include slag, limestone powder, feldspars, mullites, alumina powder, quartz powder, fly ash, volcanic ash, silica sol, carbide powder, and nitride powder. Therefore, according to these documents, a mixture containing a component such as cement, silica fume, limestone powder, ground blast furnace slag, or fly ash can be acceptable. However, Patent Documents 5 and 6 focus only on the improvement of the self-compacting and mechanical characteristics (compressive strength, and flexural strength) before hardening, and in which there is neither disclosure nor suggestion focusing on, for example, the development of early strength, or the reduction of amount of autogenous shrinkage, the reduction of hydration heat, and the like in the curing stage. Moreover, Patent Documents 5 and 6 neither describe nor suggest the chemical effects obtained by the specification of the content of the limestone powder that is an inorganic powder, and the effects obtained by the combination of limestone powder with ground blast furnace slag or fly ash.

Herein, as the document disclosing the point that the ratio of flexural strength/compressive strength of an ultra-high-strength cementitious matrix is improved, there are Patent Documents, 7, 8, and 11. Patent Document 7 is characterized in that a setting retarding agent is contained to a component such as cement, pozzolan-like fine powder, and fine aggregate, and describes that the ratio of flexural strength/compressive strength is improved due to the shrinkage reduction effect of a setting retarding agent. Further, Patent Document 8 describes that the ratio of flexural strength/compressive strength is improved by containing an expansive admixture in addition to a setting retarding agent.

On the other hand, Patent Document 11 discloses that the ratio of flexural strength/compressive strength is improved by a cementitious composition in which cement is combined with silica fume, coal gasification fly ash, and plaster in an amount in the specific range, without containing a setting retarding agent and an expansive admixture. Herein, the components common to Patent Documents 8 and 11 are coal gasification fly ash and plaster. There is a description that plaster forms ettringite in needle crystals by a hydration reaction, and the ettringite fills the pores in the cement hardened body to promote the densification, and achieves the high strength. Further, there is a disclosure that the flexural strength in a cement hardened body can be improved by mixing silica fume, and coal gasification fly ash in a specific ratio.

Moreover, Patent Documents 9 and 10 each disclose a composition of a cementitious matrix composed of cement, pozzolanic reaction particles, and sand particles. Further, metallic fibers, organic fibers, composite fibers obtained by combining organic fibers with metallic fibers, or the like are contained as fibers to reinforce the flexural strength in these cementitious matrices. In addition, examples of the pozzolanic reaction particles include silica fume, fly ash, and blast furnace slag, and there is a disclosure that the pozzolanic reaction particles contribute to a long-term improvement in the mechanical properties by heat curing.

Further, Patent Document 12 discloses a high toughness and high strength mortar composition in which the high toughness, the high compressive strength, and the high tensile strength can be developed at an early stage only by controlled normal temperature curing. The UFC disclosed in Patent Document 12 is characterized by being combined with the special cement that contains $C_3S$ and $C_3A$ at a specific ratio, silica fume, and fine aggregate having a specific grading distribution. In addition, as the pozzolanic reaction particles, silica fume is only the applicable material.

PRIOR ART DOCUMENTS

Patent Documents

Patent Document 1: Japanese Patent Application Publication No. 2007-119257
Patent Document 2: Japanese Patent Application Publication No. 2000-72518
Patent Document 3: Japanese Patent Application Publication No. Hei 08-26793
Patent Document 4: Japanese Patent Application Publication No. Hei 08-239249
Patent Document 5: Japanese Patent Application Publication No. 2002-348166
Patent Document 6: Japanese Patent Application Publication No. 2002-338323
Patent Document 7: Japanese Patent Application Publication No. 2001-181004
Patent Document 8: Japanese Patent Application Publication No. 2009-84095
Patent Document 9: Published Japanese Translation of PCT International Application No. Hei 9-500352
Patent Document 10: Japanese Patent Application Publication No. 2006-213550
Patent Document 11: Japanese Patent Application Publication No. 2006-298679
Patent Document 12: Japanese Patent Application Publication No. 2011-42534

SUMMARY

Problems to be Solved by the Invention

However, conventional ultra-high-strength fiber reinforced concretes have a large amount of shrinkage during a curing period because of i) a high unit cement content, ii) a small ratio of water/(cement+silica fume) (that is, the used amount of the cement and silica fume each of which costs a lot as a material is large), iii) a small ratio of aggregate/powder, and the like. The total amount of shrinkage of an ultra-high-strength fiber reinforced concrete material is expressed by the sum of i) autogenous shrinkage, and hardening shrinkage caused by hydration reaction, which are generated during primary curing, i.e., in the stage from the initiation of setting to the removal of a formwork, and ii) autogenous shrinkage, hardening shrinkage, and drying shrinkage, which are generated during secondary curing in which heat curing is performed in the period from the removal of a formwork to the generation of final strength. Note that the heat secondary curing is performed at 80° C. to 90° C. for 36 hours to 48 hours i) in order to obtain a predetermined final strength in a short period of time, ii) in order to complete autogenous shrinkage, hardening shrinkage, and drying shrinkage, which are generated during hydration reaction, in an early stage by accelerating the hydration reaction in a short period of time with a high temperature and sufficient water during the secondary curing, and iii) in order to form a dense hydrate structure excellent in durability by performing high temperature heat curing to thereby change capillary pores of the pore structure in a cementitious matrix to gel pores.

In the case where a pre-tensioned member is manufactured by applying an ultra-high-strength fiber reinforced concrete material, prestress is introduced after removing a formwork after the primary curing. Here, if autogenous shrinkage and hardening shrinkage, which are generated during primary curing, are large, tensile stress is generated in a cementitious matrix because a formwork restricts the shrinkage. Accordingly, the risk of developing cracks is increased. In order to avoid the situation, a measure of relieving the restriction of the formwork is employed. Examples thereof include a method of using, as a formwork material, an easily deformable material such as styrene foam and rubber which can absorb the shrinkage deformation of the concrete material. In this case, such a formwork requires more time and effort in the manufacturing than conventional steel or wooden formworks, and the cost is increased by using these expensive materials. Moreover, as for these formwork materials, the efficiency of using the formwork for other purposes is extremely poor, and a significant increase in the formwork cost poses a large problem.

Further, if autogenous shrinkage, drying shrinkage, hardening shrinkage, and the like, which are generated during secondary curing are large, the effect of introducing prestress (effective prestress ratio) is reduced because the prestress is introduced before the secondary curing in the case of manufacturing the pre-tensioned member. That is, if the amount of shrinkage during the secondary curing is large, the introduced tension force is lost because the structural member shrinks. Since the effective prestress ratio is reduced in this way, it has been required to arrange a tendon in excess allowing for the tension loss.

Meanwhile, it is necessary to add a large amount of chemical admixtures (for example, a high-range water-reducing agent) to conventional ultra-high-strength fiber reinforced concretes since these concretes require a higher fluidity while maintaining a small water-cement ratio. In the case where a large amount of chemical admixture is mixed, there has been a problem that the initial setting time is retarded and the curing time until a predetermined early strength is developed is increased.

Moreover, in order to reduce the used amount of an expensive chemical admixture, such as a high-range water-reducing agent, and to efficiently improve the fluidity with a small amount of high-range water-reducing agent, low-heat Portland cement tends to be mixed in conventional ultra-high-strength fiber reinforced concretes. The low-heat Portland cement is prepared by reducing an alite ($C_3S$) component and an aluminate phase ($C_3A$) among the cement components, which are poor in the efficiency for adsorbing a high-range water-reducing agent, and increasing a belite ($C_2S$) component, which is favorable in the efficiency for adsorbing a high-range water reducing agent. In the case where the low-heat Portland cement is used, the amount of the high-range water reducing agent added can be reduced. However, each content of the alite ($C_3S$) component and the aluminate phase ($C_3A$) that contribute to the development of early strength is reduced, and as a result, the development of early strength becomes slow and the curing time in the primary curing becomes long.

On the other hand, in the case of a pre-tensioned member, a predetermined strength is required in order to introduce the prestress after the removal of formworks. The slow development of early strength poses such a problem that the curing time of primary curing to the work steps of removing formworks and introducing prestress is increased, and the cycle time for manufacturing the structural members in which this type of material is used is increased, thus the manufacturing efficiency can be reduced. That is, as a countermeasure for the slow early strength development in a plan in which the quantity of production per day is scheduled, it is necessary to expand the capital investment including the increase in the number of formworks and the extension of the manufacturing line, and resulting in the increase in the manufacturing cost.

Moreover, this type of material is frequently subjected to heat secondary curing at 80° C. to 90° C. for 36 hours to 48 hours as the secondary curing. As described above, the supply of heat in the secondary curing is necessary in the production process. However, in order to maintain the high temperature over a long time, a large amount of fuel is required. This also poses a problem of the fuel cost accounting for a high proportion of the manufacturing cost.

A large amount of cement as a binder has been mixed in conventional ultra-high-strength fiber reinforced concretes in order to obtain ultra-high compressive strength and tensile strength of the cementitous matrix. This has posed a problem that the hydration heat temperature is increased.

One of the common methods of reducing the heat temperature includes a method in which the type of cement to be used is set to low-heat Portland cement. However, using the low-heat Portland cement, a problem of the slow development of early strength as described above occurs. Problems of a high hydration heat temperature in the manufacturing of members by using this type of ultra-high-strength fiber reinforced concrete is shown below.

(1) In the case where the heat of hydration is large in the primary stage of curing, a temperature difference is spatially developed between the inner part of a member and the outside, and the risk of development of a temperature crack due to the temperature strain by the temperature difference is increased. The risk of development of a temperature crack is high particularly in the primary stage of the curing because the strength of the ultra-high-strength fiber reinforced concrete is not sufficiently developed.

(2) In the case where a member has a thick cross section and a thin cross section, a temperature difference is developed between the members by hydration heat, and the risk of a temperature crack is increased.

(3) It is characterized that the material can be molded into a member having a thin cross section with the use of this type of material, but when a large sized structure is planned, a member having a thick cross section may also be required. For example, since a precast block has a thick cross section at a tension end member, the risk of developing a temperature crack becomes high.

The compressive strength of conventional ultra-high-strength fiber reinforced concretes has shown an allowance and has not caused a problem in many cases in the actual design in which this type of material has been employed. On the other hand, since the advantage of using this type of material as a structural member and not using the material for the reinforcement of bars is large, the ultra-high-strength fiber reinforced concrete itself is used as a member required for flexural tensile strength or a member required for flexural toughness. However, the flexural tensile strength and the flexural toughness performance of the conventional ultra-high-strength fiber reinforced concretes are limited, and further improvement in the performance has been desired.

In view of this, an object of the present invention is to provide a cementitious matrix in which the development of early strength is fast, the hydration heat temperature is small, and the amount of shrinkage during curing is small, while keeping the fluidity when concrete is fresh, and a fiber reinforced cement based mixture having high tensile strength, high flexural strength, and high flexural toughness performance, which is obtained by adding fibers into the cementitious matrix.

Solution to Problem

In order to achieve the above object, a cementitious matrix of the present invention is characterized by comprising 100 parts by weight of Portland cement, 5 to 30 parts by weight of silica fume, 5 to 25 parts by weight of limestone powder, 30 to 80 parts by weight of at least one of ground blast furnace slag or fly ash, at least one chemical admixture, water, and 70 to 150 parts by weight of aggregate having a largest aggregate diameter of 1.2 to 3.5 mm.

Further, a fiber reinforced cement based mixture of the present invention is characterized by comprising the cementitious matrix described above, and a fiber in a volume of 0.7 to 8.0% of the total volume.

Advantageous Effects of Invention

The cementitious matrix of the present invention formed as described above is characterized in that the amount of shrinkage during primary curing and secondary curing is small, the early strength after primary curing is high, the hydration heat temperature caused by hydration reaction during primary curing and secondary curing is small, and the compressive strength, tensile strength, and flexural strength after secondary curing is high, while maintaining the fresh properties in which the fluidity is kept.

Moreover, the ultra-high-strength fiber reinforced cement based mixture obtained by mixing fibers for reinforcement into the cementitious matrix of the present invention can achieve the high tensile strength, the high flexural strength, and the high toughness performance, in addition to the compressive strength, while maintaining the fresh properties in which the fluidity is kept.

DETAILED DESCRIPTION

Hereinafter, embodiments of the present invention are described. The cementitious matrix of the present embodiment is a ultra-high-strength cementitious matrix containing cement, silica fume, limestone powder, at least one of ground blast furnace slag or fly ash, at least one chemical admixture, water, and aggregate.

Further, a fiber reinforced cement based mixture of the present embodiment is an ultra-high-strength fiber reinforced cement based mixture in which reinforcing fibers are mixed into the ultra-high-strength cementitious matrix described above.

<Cement>

As the cement, Portland cement (such as ordinary Portland cement, high-early-strength Portland cement, ultra high-early-strength Portland cement, moderate-heat Portland cement, low-heat Portland cement, sulfate-resistant Portland cement, and the like) can be used.

In particular, in the case where the development of early strength is desired to be obtained at an early stage, ordinary Portland cement or high-early-strength Portland cement is preferably used. Moreover, in the case where the fluidity is desired to be improved or where the hydration heat temperature is desired to be reduced, moderate-heat Portland cement or low-heat Portland cement is preferably used.

The present cementitious matrix addresses these requirements not only by the type of cement but also by the mixing of silica fume, limestone powder, and at least one of ground blast furnace slag or fly ash, as described below. That is, silica fume, limestone powder, and at least one kind of ground blast furnace slag or fly ash are used as the mineral admixture.

<Silica Fume>

The BET specific surface area (specific surface area measured by a BET adsorption method) of silica fume is desirably 15 $m^2/g$ or more. In the case where the BET specific surface area of silica fume is less than 15 $m^2/g$, pozzolanic reaction properties is reduced, and the effect of improving the strength performance is reduced. Since the particle diameter of silica fume is also increased, the micro-filler effect and ball bearing effect that are described below decrease, and the effect on the fluidity is reduced.

Moreover, if the particle diameter of silica fume is increased, the silica fume particles are no longer sufficiently densest packed in the gap between cement particles. Accordingly, the denseness of the cementitous matrix is reduced, and the effect of improving the high durability is reduced. On the other hand, in the case of silica fume having a BET specific surface area of 15 $m^2/g$ or more, the effect of improvement in the strength, the fluidity, the high durability, and the like can be expected.

Silica fume is an ultrafine particle material obtained by collecting dust in the exhaust gas emitted when silicon metal, ferrosilicon, silicon alloy, zirconium, and the like are manufactured. As to the product shape of the silica fume to be used, the silica fume may be the one having a large mass per unit volume obtained by causing mechanical densification for increasing transport efficiency. Moreover, silica fume may also be used in a form of a silica fume slurry in which silica fume is suspended in water.

The main component of the chemical composition of silica fume is amorphous silicon dioxide ($SiO_2$). Silica fume having a high content of silicon dioxide ($SiO_2$) has higher pozzolanic reaction properties, and further a vitreous hydrate is generated. Accordingly, such silica fume contributes to the improvement in the strength performance of the cementitous matrix, and the improvement in the high durability of the cementitious matrix due to the being denser. Moreover, if the BET specific surface area becomes larger, the pozzolanic reaction properties increase, and such silica fume contributes to the improvement in the strength performances of the cementitious matrix, and the high durability due to the improvement of the densest packing of the matrix.

The particle diameter of silica fume is $1/40$ to $1/100$ of the diameter of cement particles, and extremely fine. Accordingly, a micro-filler effect of filling the pores of the cement hardened body can be expected, and the improvement in the significant densification of the hardened body structure can be achieved. The highly dense structure prevents the permeation of chloride ions, carbon dioxide, water, and the like, and thus is highly effective in suppressing the permeation of these substances that affect the rust and the like of a PC steel member and a reinforcing steel in addition to the reinforcing fibers present in a cementitious matrix, and of chemical substances, therefore, is a highly durable structure also as a structure.

Moreover, silica fume has extremely fine particle diameter and has a shape close to a sphere. Accordingly, when a cementitious matrix is mixed, the silica fume is arranged so as to be dispersed in pores between cement particles, ground blast furnace slag, fly ash, and the like. For this reason, the ball bearing effect between these particles can be expected. Then, this ball bearing effect is exerted on the significant improvement in the fluidity of the cementitious matrix.

The content of the silica fume is preferably 5 to 30 parts by weight for 100 parts by weight of cement. If the content of the silica fume is less than 5 parts by weight, the effect of the performance improvement such as improvement in strength performance, improvement in high durability, and improvement in fluidity, which silica fume can originally show, is significantly reduced. In particular, the reduction in the fluidity is significant, and when trying to obtain the fluidity forcibly, an air-entraining and high-range water-reducing agent is required to be added, accordingly this is no longer reasonable. Further, the amount of shrinkage during curing also tends to be increased. Moreover, if the content of the silica fume is more than 30 parts by weight, the viscosity of the cementitious matrix is increased. Accordingly, the predetermined fluidity cannot be obtained. In order to forcibly obtain the fluidity, it is necessary to excessively add an air-entraining and high-range water-reducing agent and add water. However, the excessive addition of an air-entraining and high-range water-reducing agent not only increases material unit cost, but also retards the development of early strength of the cementitious matrix.

Moreover, if the content of the silica fume to be mixed is more than 30 parts by weight, the autogenous shrinkage and the plastic shrinkage are increased, and the risk of crack development is increased. In general, it is known that as in the case where high unit cement content results in high autogenous shrinkage, high unit silica fume content results in high autogenous shrinkage. On the other hand, in the present cementitious matrix, the unit cement content is set to a low level, and at the same time, the content of silica fume to be mixed is set to a low level of 5 to 30 parts by weight for the content of cement. As a result of the reduction of the unit silica fume content as described above, the amount of autogenous shrinkage can be reduced. The content of the silica fume is more preferably 7 to 25 parts by weight for 100 parts by weight of cement.

<Limestone Powder>

In the present cementitious matrix, limestone powder is used as a mineral admixture. The limestone powder is a mineral admixture, but does not undergo pozzolanic reaction. Accordingly, it is not a pozzolanic reaction particle (pozzolanic material). That is, in the present cementitious matrix, the unit cement content is reduced by mixing silica fume, limestone powder, and at least one kind of ground blast furnace slag or fly ash, as a mineral admixture, in addition to cement, and thus the loss such as the reduction in the strength and the retardation of the development of early strength, which are caused by the reduction in the unit cement content, is covered. Further, the present cementitious matrix contributes to the reduction in the amount of shrinkage during curing, and the reduction in hydration heat.

In particular, by mixing limestone powder that does not undergo pozzolanic reaction, and a pozzolanic material such as ground blast furnace slag, or fly ash, the present cementitious matrix can obtain more excellent shrinkage reduction effect than that obtained by mixing only the pozzolanic material. That is because i) the unit cement content is reduced by replacing unit weight of cement with that of limestone powder and thus the total shrinkage can be reduced; and ii) the limestone powder having a smaller shrinkage rate than the shrinkage rate due to pozzolanic reaction is substituted for a pozzolanic material (ground blast furnace slag or fly ash) by replacing unit weight of the pozzolanic material with that of limestone powder, and thus the total shrinkage can be reduced.

Incidentally, in order to develop the early strength at an early stage, it is considered to change the type of cement, for example, change the type of Portland cement to be used to high-early-strength Portland cement. However, when the high-early-strength Portland cement is used, a problem of increase in the amount of shrinkage and a hydration heat temperature occurs because the high-early-strength Portland cement contains a large amount of alite ($C_3S$) and an aluminate phase ($C_3A$) as the mineral phases.

In this respect, the present cementitous matrix has enabled the development of early strength at an early stage without the increase of the amount of shrinkage and the hydration heat temperature, by mixing 5 to 25 parts by weight of limestone powder for the content of cement, even if the type of cement is not changed to the high-early-strength Portland cement. Such an effect is obtained probably because i) the limestone powder accelerates the initial hydration of alite ($C_3S$) in cement, and the early strength of the cementitious matrix is improved, and ii) the limestone powder reacts with calcium aluminate ($C_3A$) in cement to form a hydrate such as monocarbo-aluminate ($C_3ACaCO_3.11H_2O$) and contributes to the development of the early strength.

Here, since ground blast furnace slag and fly ash as pozzolanic materials can also accelerate the initial hydration of alite ($C_3S$) in cement and can improve the early strength of the cementitious matrix, these pozzolanic materials are mixed in the present cementitious matrix. However, since limestone powder has a larger effect on the development of early strength than those of ground blast furnace slag and fly ash, the early strength can be efficiently developed by mixing the limestone powder.

On the other hand, limestone powder exerts an effect on the development of early strength, however, the effect cannot be expected on the development of long-term strength. For this reason, by mixing with the fly ash as a pozzolanic material, the limestone powder is capable of expecting a pozzolanic reaction by which strength is developed on a long-term basis, and capable of achieving an improvement in long-term strength by the pozzolanic reaction during secondary curing. Alternatively, by mixing with ground blast furnace slag, the limestone powder is capable of expecting the latent hydraulicity hydration reaction and achieving the improvement in long-term strength after secondary curing.

Moreover, initial hydration of an aluminate phase ($C_3A$) that generates the largest heat in the mineral phases of cement can be suppressed by the mixture of fly ash or ground blast furnace slag as a pozzolanic material. Although this effect is lower than that of limestone powder, reduction in the hydration heat temperature can be achieved without changing the type of cement. Further, the early strength can be developed at an early stage.

The present cementitious matrix has low unit cement content as described above. Accordingly, the amount of hydration reaction of cement is reduced and the effect of reducing the hydration heat temperature can be obtained. In addition, in order to prevent the strength properties such as the compressive strength and the tensile strength from being reduced even if the unit cement content is decreased, 5 to 25 parts by weight of limestone powder having a Blaine specific surface area (specific surface area measured by a Blaine air permeability measuring apparatus) of 5,000 to 18,000 $cm^2/g$ is mixed with 100 parts by weight of cement in addition to a pozzolanic material such as ground blast furnace slag and fly ash. In this way, further improvement in an effect can be achieved as compared with that in the effect on the reduction in the heat of hydration obtained by the mixture of only the pozzolanic material. This is because i) since the unit weight of cement can be replaced with that of limestone powder, the unit cement content can be reduced, and thus the hydration heat temperature is reduced; and ii) since the unit weight of pozzolanic material (ground blast furnace slag or fly ash) can be replaced with that of limestone powder, the total heat generation can be reduced by the replacement to the limestone powder which has a lower heat temperature than that of the pozzolanic reaction.

Incidentally, the data (entropy) with respect to the hydration heat of mineral phases of cement is shown as follows: aluminate phase $(C_3A)$=8.41 (cal/mol deg), ferrite phase $(C_3AF)$=6.31 (cal/mol deg), alite $(C_3S)$=1.8 (cal/mol deg), and belite $(C_2S)$=1.5 (cal/mol deg). These data show that the suppression of hydration of an aluminate phase $(C_3A)$ is efficient.

In the present cementitious matrix, limestone powder can more efficiently suppress the initial hydration of an aluminate phase $(C_3A)$ having the largest heat temperature in the mineral phases of cement than a pozzolanic material (ground blast furnace slag or fly ash). Accordingly, reduction in the hydration heat temperature can be effectively achieved. Therefore, reduction in the hydration heat temperature can be achieved without changing the type of cement, for example, changing the cement to low-heat Portland cement. Moreover, early strength can be developed at an early stage in the state where the initial hydration heat temperature is reduced.

Thus, an efficient effect can be obtained for the reduction in the amount of shrinkage, the development of early strength at an early stage, the reduction in hydration heat temperature, and the like by the mixture of limestone powder in the cementitious matrix. Further, the limestone powder can provide an effect also for the improvement in the fluidity of the cementitious matrix and the fiber reinforced cement based mixed material manufactured using the cementitious matrix.

Here, it is considered that the water-reducing effect by a high-range water-reducing agent (for example, polycarboxylic acid-based one, and the like), which is described below, is the dispersion function by the "steric hindrance effect" of polymer of the water-reducing agent adsorbed to powder. According to the measurement of the amount of adsorption, limestone powder has more excellent dispersion performance than that of cement, ground blast furnace slag, or the like, and a high dispersion effect can be obtained by using the limestone powder, even if the content of the high-range water reducing agent is small.

Moreover, since the particle diameter of limestone powder is smaller than that of a cement particle, the limestone powder has a micro-filler effect of filling cement pores similar to silica fume, or a pozzolanic material such as fly ash or ground blast furnace slag, and thus the limestone powder is an optimal material for the densest packing. In addition, the particle shape of the limestone powder is close to a sphere, and according to the ball bearing effect, the limestone powder can more efficiently achieve the improvement in the fluidity than fly ash or ground blast furnace slag in the presence of a small amount of water and a high-range water-reducing agent.

In the case where the Blaine specific surface area of limestone powder is less than 5,000 cm$^2$/g, the activity as limestone powder is reduced. Accordingly, in addition to the shrinkage reduction effect, the effect of achieving early strength, the effect of reduction in hydration heat temperature, and the like cannot be expected. Further, since the micro-filler effect of filling cement pores and the ball bearing effect cannot be sufficiently expected, the improvement in the fluidity cannot be expected. On the other hand, if the Blaine specific surface area of limestone powder is larger than 18,000 cm$^2$/g, the activity as limestone powder is improved, and thus the above effects may be satisfied. However, treatment equipment for classification or grinding classification for the manufacturing of the limestone powder having a high Blaine specific surface area is required, and the material cannot be economically obtained. The Blaine specific surface area of the limestone powder is more preferably 7,000 to 15,000 cm$^2$/g.

In the case where the content of the limestone powder is less than 5 parts by weight for 100 parts by weight of cement, the effect expected from the limestone powder, such as the reduction in shrinkage, the early strength, and the reduction in a hydration heat temperature, cannot sufficiently be expected. Five parts by weight or more of limestone powder are required for the reduction in the initial shrinkage that is particularly important. On the other hand, in the case where the content of the limestone powder is larger than 25 parts by weight, if the unit cement content is not changed, the mixing ratio of a pozzolanic material such as ground blast furnace slag or fly ash, and silica fume may be reduced, and the fluidity is significantly reduced. Conversely, if the mixing ratio of a pozzolanic material or silica fume is not changed, the unit cement content is necessary to be reduced, as a result of which the strength properties are reduced. The content of the limestone powder is more preferably 7 to 22 parts by weight for 100 parts by weight of cement.

<Ground Blast Furnace Slag•Fly Ash (Pozzolanic Material)>

As the ground blast furnace slag to be mixed in the present cementitious matrix, there are ground granulated blast furnace slag and ground air-cooled blast furnace slag, and between them the ground granulated blast furnace slag is preferred. Further, as the fly ash, there are classified fly ash, and coal gasification fly ash in addition to ordinary fly ash, and any fly ash can be applied.

The Blaine specific surface area of the ground blast furnace slag is preferably 3,000 cm$^2$/g or more. Further, the Blaine specific surface area of the fly ash is preferably 2,500 cm$^2$/g or more.

In the present cementitious matrix, examples of the functions of applying the ground blast furnace slag or the fly ash as a mineral admixture include: i) reducing the unit cement content by replacing cement with the blast furnace slag and/or fly ash, and thus contributing to the reduction in a hydration heat temperature; ii) accelerating the initial hydration of alite $(C_3S)$ in cement, and thus improving the early strength of the cementitious matrix; iii) contributing to the development of mid-term to long-term strength due to a latent hydraulicity reaction and/or pozzolanic reaction; iv) suppressing the initial hydration of an aluminate phase $(C_3A)$ in cement, and thus contributing to the reduction in a hydration heat temperature; v) improving the fluidity of the cementitious matrix containing only a small amount of water due to the ball bearing effect; and vi) converting the cementitous matrix to a denser structure due to the micro-filler effect of the blast furnace slag and/or fly ash, which fills the cement pores.

Herein, in the case where the Blaine specific surface area of the ground blast furnace slag is less than 3,000 cm$^2$/g, the fineness is reduced, and thus the reaction ratio of the latent hydraulicity possessed by the ground blast furnace slag is reduced. Therefore, there are influences that: i) the effect of accelerating the initial hydration of alite $(C_3S)$ in cement is reduced, and thus the effect of improving early strength is reduced; ii) the effect of developing mid-term strength by the latent hydraulicity is reduced, in particular, the strength development under heat curing is reduced; iii) the effect of suppressing initial hydration of an aluminate phase ($C_3A$) in cement is reduced; and the like. In the case where the Blaine specific surface area of the ground blast furnace slag is 10,000 $cm^2/g$ or more, the fineness is significantly improved, and as a result, the ground blast furnace slag effectively contributes to the reduction in hydration heat, to the high fluidity, to the high strength, to the increase in the sulfate resistance, to the increase in the resistance against seawater, and the like. However, treatment equipment for classification or grinding classification for manufacturing the ground blast furnace slag having a high Blaine specific surface area is required, and thus the material cannot be economically obtained. The Blaine specific surface area of the ground blast furnace slag is more preferably 4,000 to 9,000 $cm^2/g$.

On the other hand, in the case where the Blaine specific surface area of the fly ash is less than 2,500 $cm^2/g$, the mean particle diameter of the pozzolanic material becomes large. Accordingly, the ball bearing effect and the micro-filler effect are reduced, and as a result, the fluidity and the denseness are difficult to be secured. Moreover, the pozzolanic reaction activity is reduced, and the pozzolanic reaction phase, which affects the improvement of the long-term strength, is not sufficiently formed, as a result, the improvement of the long-term strength cannot be expected. On the other hand, in the case where the Blaine specific surface area of the pozzolanic material excluding silica fume is larger than 20,000 $cm^2/g$, the pozzolanic reaction properties are significantly increased, and in addition to the improvement in long-term strength, the reduction of hydration heat, the improvement of the durability performance due to the densification of matrix, and the like can be expected. However, a treatment process for classification or grinding classification is required, and thus the material cannot be economically obtained. The Blaine specific surface area of the fly ash is more preferably 3,500 to 18,000 $cm^2/g$.

In addition, the content of a mineral admixture containing at least one of ground blast furnace slag and fly ash in the present cementitious matrix is preferably 30 to 80 parts by weight for 100 parts by weight of cement. In the case where the content of the blast furnace slag and/or fly ash is less than 30 parts by weight, the function such as the development of the mid-term to long-term strength due to the latent hydraulicity possessed by the blast furnace slag and/or fly ash and/or the pozzolanic reaction, the reduction of hydration heat, the high fluidity, and the improvement of the durability cannot be sufficiently achieved. In particular, as to the fluidity, even if silica fume is mixed in an appropriate amount, and even if water is contained in a predetermined amount, the fluidity cannot be obtained due to the influence by the deviation of the grading distribution in the total amount of the powder. On the other hand, in the case where the content of the blast furnace slag and/or fly ash is more than 80 parts by weight, the unit cement content is necessary to be reduced or the content of aggregate to be mixed is necessary to be reduced. Accordingly, a problem in which the strength is reduced, the fluidity cannot be ensured, the amount of shrinkage is increased, or the like occurs. Therefore, the content of the blast furnace slag and/or fly ash is more preferably 40 to 75 parts by weight for 100 parts by weight of cement.

<Chemical Admixture>

The chemical admixture mixed into the present cementitious matrix is an additive agent used for a variety of purposes of improvement of fluidity, improvement of strength development, setting control, and improvement of durability, and the like, and at least one kind is used. For the chemical admixture, a high-range water-reducing agent, an air-entraining and high-range water-reducing agent, a plasticizing agent, an anti-foaming agent, a setting accelerating agent, a setting retarding agent, a thickening agent, a shrinkage reducing agent, a quick setting agent, a foaming agent, a rust-preventive agent, and the like can be used alone or in combination thereof.

A high-range water-reducing agent or an air-entraining and high-range water-reducing agent is used in order to try to improve the fluidity by a small unit water content. Examples of the high-range water-reducing agent include a polycarboxylate-based high-range water-reducing agent, a polyalkylallyl sulfonate-based high-range water-reducing agent, an aromatic aminosulfonate-based high-range water-reducing agent, and a melamine formalin resin sulfonate-based high-range water-reducing agent. Examples of the air-entraining and high-range water-reducing agent include an alkylallyl sulfonate-based air-entraining and high-range water-reducing agent, an aromatic aminosulfonate-based air-entraining and high-range water-reducing agent, a melamine formalin resin sulfonate-based air-entraining and high-range water-reducing agent, and a polycarboxylate-based air-entraining and high-range water-reducing agent. The amount of the high-range water-reducing agent to be used is not limited to, but as long as it is 3 to 5 parts by weight for 100 parts by weight of cement, the favorable fluidity can be obtained. An anti-foaming agent may be used in combination with the high-range water-reducing agent in order to defoam air entrained during mixing.

<Water>

The water mixed into the present cementitious matrix is not limited as long as it does not contain impurities, such as city water. Although the amount of water used depends on a high-range water-reducing agent or an air-entraining and high-range water-reducing agent to be used, or unit cement content, as long as the amount of water used is 21 to 26 parts by weight for 100 parts by weight of cement, the favorable fluidity and strength properties can be obtained.

<Aggregate>

For the aggregate mixed into the present cementitious matrix, river sand, sea sand, silica sand, crushed sand, crushed sand of limestone, sand of a recycled aggregate, crushed sand of fired bauxite, crushed sand of an iron ore, crushed sand of quartz-porphyrite, crushed sand of blast furnace slag, fine quartz powder, fine silica stone powder, fine rock powder, and the like can be used alone or in combination thereof.

In the present cementitious matrix, 70 to 150 parts by weight of aggregate having a largest particle diameter Dmax, that is, a largest aggregate particle diameter, of 1.2 to 3.5 mm is mixed with 100 parts by weight of cement. Herein, the largest particle diameter Dmax is a particle size (diameter) in a particle-diameter accumulation curve of the aggregate at a weight ratio of 100% in weight percent passing (or passage ratio), and corresponds to $D_{100}$.

If the largest aggregate diameter is set to less than 1.2 mm, the skeleton of the aggregate for reducing the shrinkage of the cementitious matrix is not sufficiently formed, and the effect of suppressing the shrinkage is reduced. On the other hand, if the largest aggregate diameter is set to more than 3.5 mm, the boundary area between the surface of aggregate and cement paste is increased. Accordingly, the proportion of reduction in the peel strength or the bond strength in this boundary part is increased relative to that of the whole cementitious matrix. As a result, the flexural strength or tensile strength of the cementitious matrix is significantly reduced. A more preferred largest aggregate diameter $D_{100}$ is 1.5 to 2.5 mm.

In the present cementitious matrix, the mean particle diameter $D_{50}$ of the aggregate is preferably 0.17 to 0.80 mm. Further, the mean particle diameter $D_{50}$ of the aggregate means a particle size (diameter) in a particle-diameter accumulation curve of the aggregate at a weight ratio of 50% in weight percent passing (or passage ratio), and corresponds to what is called $D_{50}$. If the mean particle diameter of the aggregate is set to less than 0.17 mm, the skeleton of the aggregate for suppressing the shrinkage of the cementitious matrix is not formed, and thus the shrinkage is increased. In addition, in the case where the powder, water, and a chemical admixture are mixed, the aggregate has a role to improve the mixing efficiency, however, in the case where the mean particle diameter of the aggregate is less than 0.17 mm, the mixing efficiency is reduced. On the other hand, in the case where the mean particle diameter is larger than 0.80 mm, the skeleton of the aggregate for suppressing the shrinkage of the cementitious matrix is sufficiently formed, however, the probability of the increase of the boundary area between the surface of aggregate and the cement paste is increased. Accordingly, the proportion of the reduction in peel strength or bond strength in this boundary part is increased relative to that of the whole cementitious matrix. As a result, the flexural strength or tensile strength of the cementitious matrix is significantly reduced. The mean particle diameter $D_{50}$ of the aggregate is more preferably 0.20 to 0.40 mm.

The content of the aggregate having a largest aggregate diameter $D_{100}$ of 1.2 to 3.5 mm is preferably 70 to 150 parts by weight for 100 parts by weight of cement. The aggregate content of the present cementitious matrix is higher by about 30 to 50 parts by weight than that of a conventional ultra-high-strength fiber reinforced concrete. A large amount of aggregate having a largest aggregate diameter larger than the largest aggregate diameter shown in Patent Documents 5 to 11 is mixed into the cementitious matrix, and thus a firm skeleton of aggregate is formed in the cementitious matrix. Such a skeleton of aggregate functions as a skeleton of shrinkage resistance not locally but macroscopically spatially against the shrinkage such as autogenous shrinkage or hardening shrinkage, or drying shrinkage. As a result, the amount of shrinkage can be reduced without developing the cracks caused by the shrinkage.

In the case where the content of the aggregate is less than 70 parts by weight, the content of powder relatively increases, and thus the skeleton of the aggregate is reduced. As a result, a problem of the increase in the amount of shrinkage, the increase in viscosity caused by excessive powder content, the necessity of excess high-range water-reducing agent for reducing the viscosity, the increase in heat of cement hydration, the reduction in shear transmission force between cementitious matrices due to the reduction in the content of the aggregate, or the like occurs. On the other hand, in the case where the content of the aggregate is more than 150 parts by weight, the content of powder is relatively reduced, and thus the effect of reducing the shrinkage is sufficient. However, the reduction in the compressive strength, the flexural strength, the tensile strength, and the like, which are caused by the reduction in a binder, is generated. The content of aggregate in a cementitious matrix is preferably 80 to 135 parts by weight.

The cementitious matrix of the present embodiment formed in this way is characterized in that the amount of shrinkage during curing is small; the development of early strength during primary curing is fast; and the hydration heat temperature caused by hydration reaction is small, while maintaining the fresh properties in which the fluidity is kept. Moreover, since the amount of shrinkage can be reduced also in the secondary curing, the estimate of tension loss of a pre-tensioned member can be reduced, and the cost of a tendon and the arrangement time and effort of the tendon can be saved.

Further, the unit cement content of the present cementitious matrix can be reduced, and when compared with the conventional ultra-high-strength fiber reinforced concretes, the unit cement content can be reduced by at least about 100 to 250 kg/m$^3$ by unit cement content.

Moreover, if the content of silica fume is 5 to 30 parts by weight for 100 parts by weight of cement, the mixed content of silica fume is a reduced amount as compared with that of conventional materials. That is, a large amount of cement is used and a large amount of expensive raw materials such as silica fume are used in a cementitious matrix forming a conventional ultra-high-strength fiber reinforced concrete. As a result, strength such as ultra-high compressive strength and tensile strength is obtained, and a highly dense and highly durable material has been achieved. However, silica fume has the highest material unit cost, which is one of the reasons why the conventional ultra-high-strength fiber reinforced concrete is an extremely expensive material.

Therefore, if the amount of the silica fume used can be reduced, the material can be economically obtained. In the present cementitious matrix, even if the amount of silica fume mixed is reduced, limestone powder, and ground blast furnace slag and/or fly ash, each of which has a specified Blaine specific surface area, are mixed in specified mix proportions, in addition to the silica fume. This allows the reduction in the amount of shrinkage, the development of early strength at an early stage, and the reduction in heat of hydration. For such a reason, the material cost of the present cementitious matrix can be reduced.

<Fiber>

The ultra-high-strength fiber reinforced cement based mixed material (ultra-high-strength fiber reinforced concrete) of the present embodiment is obtained by mixing either metallic fibers, organic fibers, or composite (hybrid) fibers in which organic fibers and metallic fibers are mixed, into the present cementitious matrix as described above. That is, the fiber reinforced cement based mixed material of the present embodiment is not dependent on the material of fibers to be mixed.

Examples of the metallic fibers which can be mixed include steel fibers, high-strength steel fibers, stainless steel fibers, titanium fibers, and aluminum fibers. Moreover, as the organic fibers, polypropylene (PP) fibers, polyvinyl alcoholic (PVA) fibers, aramid fibers, polyethylene fibers, ultra-high-strength polyethylene fibers, polyethylene terephthalate (PET) fibers, rayon fibers, nylon fibers, polyvinyl chloride fibers, polyester fibers, acrylic fibers, anti-alkali glass fibers, and the like can be used.

Further, composite fibers in which organic fibers are mixed with metallic fibers can be used. The reinforcing effect of metallic fibers can be greatly expected in a region where tensile strain is small (for example, in the state where the width of a crack immediately after development of the crack is small). On the other hand, tensile reinforcement effect due to the organic fibers can be greatly expected in the region where the width of a crack is increased and the tensile strain is large. As described above, fiber reinforcement effect can be effectively expected in a wide region of tensile strain by using composite fibers.

Moreover, the total volume of the fibers to be mixed (the volume of the mixed fibers) is preferably adjusted such that the ratio of the volume of the mixed fibers to the total volume of the ultra-high-strength fiber reinforced cement based mixture (volume mixing ratio) is 0.7 to 8.0%. That is, if the volume mixing ratio of fibers is 0.7%, the amount is large enough to expect, although a fiber bridging effect for the ultra-high-strength fiber reinforced cement based mixture is small. However, while a volume mixing ratio of 8.0% is an amount with which a fiber bridging effect can be sufficiently expected, when a volume of fibers equal to or larger than this is mixed into the cementitious matrix, the fresh properties in the mixed state cannot be maintained, and thus the self-compacting becomes difficult. This leads to a possibility that the ultra-high-strength fiber reinforced cement based mixture cannot be practically used as a structural material. The total amount of the fibers to be mixed can be more preferably such that the volume mixing ratio is 1.0 to 5.5%.

Example 1

Hereinafter, in this Example 1, the results of the tests performed to verify the performance of the cementitious matrix described in the above embodiments is described. In addition, the description is provided by giving the same terminology to the portions that are the same as or equivalent to the contents described in the above embodiments.

[Materials Used]

Tables 1 and 2 show specifications of the materials used in the tests of Example 1.

TABLE 1

| Basic Material | Type of Material | Density ($g/cm^3$) | Blaine Specific Surface Area ($cm^2/g$) | BET Specific Surface Area ($m^2/g$) |
|---|---|---|---|---|
| Cement (manufactured by Taiheiyo Cement Corporation) | Ordinary Portland Cement | 3.16 | 3,220 | — |
| | Moderate Heat Portland Cement | 3.21 | 3,200 | — |
| Silica Fume | Produced in Egypt | 2.25 | — | 17.1 |
| Limestone powder | Limestone powder A | 2.71 | 15,220 | — |
| | Limestone powder B | 2.71 | 9,550 | — |
| | Limestone powder C | 2.71 | 7,330 | — |
| | Limestone powder D | 2.71 | 5,110 | — |
| Ground Blast Furnace Slag | Ground Blast Furnace Slag A | 2.91 | 8,470 | — |
| | Ground Blast Furnace Slag B | 2.91 | 6,130 | — |
| | Ground Blast Furnace Slag C | 2.91 | 4,590 | — |
| Fly Ash | Produced in Japan | 2.32 | 4,180 | — |

TABLE 2

| Basic Material | Type of Material | Density ($g/cm^3$) | Particle Diameter (mm) Largest Particle Diameter $D_{100}$ | Particle Diameter (mm) Mean Particle Diameter $D_{50}$ |
|---|---|---|---|---|
| Fine Aggregate + Quartz Aggregate Quartz Aggregate | Aggregate A | 2.59 | 2.50 | 0.27 |
| | Aggregate B | 2.59 | 2.50 | 0.26 |
| | Aggregate C | 2.60 | 1.70 | 0.24 |
| | Aggregate D | 2.60 | 1.70 | 0.23 |
| | Aggregate E | 2.60 | 2.36 | 0.23 |

[Test Items and Test Methods]
(1) Flow value: the flow value is a flow value without falling motion (mm) measured by a method in accordance with "JIS R 5201 (Physical test method for cement)", without performing 15 times falling motion, and in the state where 90 seconds have passed from the start of the flow test.
(2) Flow time: the flow time is the time required until the above flow value reaches 200 mm.
(3) Compressive strength: the compressive strength was measured by a method in accordance with "The Standard of Japan Society of Civil Engineers JSCE-F 506 (Method for preparing cylindrical specimens for compressive strength tests of mortar or cement paste)" and "The Standard of Japan Society of Civil Engineers JSCE-G 505 (Test method for compressive strength of mortar or cement paste using cylindrical specimens)". A mixed material was poured into a formwork having an inner space measuring $\phi 5 \times 10$ cm and cured at 20° C. for 48 hours as primary curing to obtain hardened specimens. Then, the resulting hardened specimens were tested and measured for compressive strength (compressive strength after primary curing). Subsequently, the hardened specimens after primary curing were subjected to secondary curing in which the hardened specimens were heated to 85° C. at a heating rate of +15° C./hr, maintained at 85° C. for 40 hours, and cooled to 20° C. at a cooling rate of −5° C./hr. The resulting hardened specimens were tested and measured for compressive strength (compressive strength after secondary curing). Note that three specimens were prepared in the tests, and the mean value of the strength test results was used as compressive strength data.
(4) Flexural strength: the flexural strength was measured by a method in accordance with "JIS R 5201 (Physical test method for cement)". A mixed material was poured into a formwork in the shape of a square column and having an inner space measuring $\phi 4 \times 4 \times 16$ cm and cured at 20° C. for 48 hours as primary curing to obtain hardened specimens. The resulting hardened specimens were tested and measured for flexural strength (flexural strength after primary curing). Subsequently, the hardened specimens after primary curing were subjected to secondary curing in which the hardened specimens were heated to 85° C. at a heating rate of +15° C./hr, maintained at 85° C. for 40 hours, and cooled to 20° C. at a cooling rate of −5° C./hr. The resulting hardened specimens were tested and measured for flexural strength (flexural strength after secondary curing). Note that three specimens were prepared in the tests, and the mean value of the flexural test results was used as flexural strength data.
(5) Splitting tensile strength: the splitting tensile strength was measured by a method in accordance with "JIS A 1113 (Test method for splitting tensile strength of concrete)". A mixed material was poured into a formwork having an inner space measuring $\phi 10 \times 20$ cm and subjected to the above-described primary curing to obtain hardened specimens, followed by secondary curing in which the hardened specimens were heated to 85° C. at a heating rate of +15° C./hr, maintained at 85° C. for 40 hours, and cooled to 20° C. at a cooling rate of −5° C./hr. The resulting hardened specimens were tested and measured for splitting tensile strength (splitting tensile strength after secondary curing).

(6) Length change: there is provided a formwork in the shape of a square column and having an inner space measuring φ10×10×40 cm, on the inner surface of which a Teflon sheet (registered trademark) is placed for avoiding the restriction by the formwork during shrinkage of a material. An embedded strain gage (KH-100HB manufactured by Tokyo Sokki Kenkyujo Co., Ltd.) having a gage length of 100 mm and a thermocouple are fixed with a cotton yarn, suspended in mid-air, in the central part of the formwork, and then a mixed material is poured. The measurement data of strain and temperature is recorded with a data logger from immediately after the pouring to determine the strain (length change) after the completion of setting of the material. Note that since the length change due to the temperature change (heat caused by hydration reaction and heat caused by curing) of the material is also included in the measurement data of the embedded strain gage, the value of the length change by heat is corrected from the thermograph, and the length change is determined as a value of the length change at 20° C.

(7) Adiabatic temperature rise test: a test for determining adiabatic temperature rise, in which a thermocouple sensor is installed in the central part in a formwork having an inner space measuring φ20×20×20 cm and on the outer surface of the formwork, and a mixed material is poured into the formwork. The outside of the formwork is covered with a heat insulating material made of styrene foam so that the adiabatic state is kept. The temperature change of the specimen covered with a heat insulating material is measured in a thermostatic chamber at 20° C. from immediately after the pouring. In this adiabatic test, since the complete adiabatic state cannot be maintained, the ideal adiabatic temperature rise is determined from the temperature in the center portion of the specimen and the time-series temperature outside the formwork, assuming the heat radiation coefficient to be 0.015.

[Mix Proportions]

Table 3 shows the mix proportions (numerical values show parts by weight) for 20 cases of the cementitious matrix of the present embodiment (Examples) and Comparative Examples.

TABLE 3

| | | | Mix Proportion (parts by weight for 100 parts by weight of cement) | | | | | | |
|---|---|---|---|---|---|---|---|---|---|
| | | | | | Ground Blast Furnace Slag and/or Fly Ash | | | | |
| Classification | Run Number | Type of Cement | Silica Fume | Limestone Powder | Ground Blast Furnace Slag | | Fly Ash | Total | Aggregate |
| Example | 1-1 | Moderate-heat | 15 | B 12 | A | 64 | 0 | 64 | A 128 |
| Example | 1-2 | Moderate-heat | 15 | B 20 | A | 55 | 0 | 55 | A 128 |
| Example | 1-3 | Moderate-heat | 15 | B 12 | A | 32 | 24 | 56 | A 128 |
| Example | 1-4 | Moderate-heat | 15 | B 20 | A | 30 | 22 | 52 | A 128 |
| Example | 1-5 | Moderate-heat | 15 | B 5 | A | 69 | 0 | 69 | A 128 |
| Example | 1-6 | Moderate-heat | 15 | B 5 | A | 35 | 29 | 64 | A 128 |
| Comparative Example | 1-7 | Moderate-heat | 15 | — 0 | — | 0 | 58 | 58 | A 128 |
| Comparative Example | 1-8 | Moderate-heat | 15 | — 0 | A | 33 | 32 | 65 | A 128 |
| Comparative Example | 1-9 | Moderate-heat | 15 | — 0 | A | 75 | 0 | 75 | A 128 |
| Comparative Example | 1-10 | Moderate-heat | 15 | B 30 | A | 21 | 26 | 47 | A 128 |
| Example | 2-1 | Ordinary | 15 | B 12 | B | 62 | 0 | 62 | A 128 |
| Example | 2-2 | Ordinary | 15 | B 20 | A | 54 | 0 | 54 | A 128 |
| Example | 2-3 | Ordinary | 15 | B 12 | B | 31 | 25 | 56 | A 128 |
| Example | 2-4 | Ordinary | 15 | B 20 | A | 27 | 22 | 49 | A 128 |
| Example | 2-5 | Ordinary | 15 | B 5 | A | 70 | 0 | 70 | A 128 |
| Example | 2-6 | Ordinary | 15 | B 5 | A | 35 | 28 | 63 | A 128 |
| Comparative Example | 2-7 | Ordinary | 15 | — 0 | — | 0 | 60 | 60 | A 128 |
| Comparative Example | 2-8 | Ordinary | 15 | — 0 | B | 33 | 33 | 66 | A 128 |
| Comparative Example | 2-9 | Ordinary | 15 | — 0 | A | 75 | 0 | 75 | A 128 |
| Comparative Example | 2-10 | Ordinary | 15 | B 30 | B | 22 | 17 | 39 | A 128 |

The purpose of setting the mix proportions to those shown in Table 3 is: i) to reveal the influence of the difference of the cement type between moderate-heat Portland cement (Run Numbers 1-1 to 1-10) and ordinary Portland cement (Run Numbers 2-1 to 2-10) on the test results; ii) to reveal the influence on the test results when the content of limestone powder for 100 parts by weight of cement is changed to between 0 to 30 parts by weight; iii) to reveal that the advantageous effect of invention of the present cementitious matrix is maintained even when either one of ground blast furnace slag or fly ash, or the combination of ground blast furnace slag and fly ash is used; and iv) to reveal that the advantageous effect of invention of the present cementitious matrix is maintained even when the Blaine specific surface area of ground blast furnace slag is changed within the range of a specified value.

On the other hand, Table 4 shows the mix proportions (numerical values show parts by weight) for 34 cases of the present cementitious matrix (Examples) and Comparative Examples, which are set from a different point of view.

TABLE 4

| | | | | | Ground Blast Furnace Slag and/or Fly Ash | | | | |
|---|---|---|---|---|---|---|---|---|---|
| Classification | Run Number | Type of Cement | Silica Fume | Limestone Powder | | Ground Blast Furnace Slag | Fly Ash | Total | Aggregate |
| Example | 3-1 | Moderate-heat | 15 | B | 12 | — | 0 | 67 | 67 | A | 109 |
| Example | 3-2 | Moderate-heat | 15 | B | 12 | A | 42 | 34 | 76 | A | 109 |
| Example | 3-3 | Moderate-heat | 15 | B | 12 | A | 37 | 30 | 67 | A | 118 |
| Example | 3-4 | Moderate-heat | 15 | B | 12 | — | 0 | 59 | 59 | A | 118 |
| Example | 3-5 | Moderate-heat | 15 | B | 12 | A | 74 | 0 | 74 | A | 118 |
| Example | 3-6 | Moderate-heat | 15 | B | 11 | — | 0 | 46 | 46 | A | 134 |
| Example | 3-7 | Moderate-heat | 15 | B | 11 | A | 29 | 23 | 52 | A | 134 |
| Example | 3-8 | Moderate-heat | 15 | B | 11 | A | 58 | 0 | 58 | A | 134 |
| Example | 3-9 | Moderate-heat | 15 | D | 12 | A | 32 | 25 | 57 | A | 128 |
| Example | 3-10 | Moderate-heat | 15 | B | 12 | A | 32 | 25 | 57 | A | 128 |
| Example | 3-11 | Moderate-heat | 15 | A | 12 | A | 32 | 25 | 57 | A | 128 |
| Example | 3-12 | Moderate-heat | 15 | D | 20 | A | 28 | 22 | 50 | A | 128 |
| Example | 3-13 | Moderate-heat | 15 | B | 20 | A | 28 | 22 | 50 | A | 128 |
| Example | 3-14 | Moderate-heat | 15 | B | 20 | C | 28 | 22 | 50 | A | 128 |
| Example | 3-15 | Moderate-heat | 5 | B | 20 | A | 38 | 23 | 61 | A | 128 |
| Example | 3-16 | Moderate-heat | 30 | B | 12 | A | 30 | 12 | 42 | A | 128 |
| Example | 3-17 | Moderate-heat | 25 | B | 24 | A | 30 | 0 | 30 | A | 135 |
| Example | 3-18 | Moderate-heat | 11 | B | 10 | A | 45 | 35 | 80 | A | 109 |
| Example | 3-19 | Moderate-heat | 15 | B | 25 | A | 25 | 19 | 44 | A | 128 |
| Example | 3-20 | Moderate-heat | 18 | C | 20 | A | 43 | 37 | 80 | A | 72 |
| Example | 3-21 | Moderate-heat | 10 | C | 10 | A | 27 | 21 | 48 | A | 145 |
| Comparative Example | 3-22 | Moderate-heat | 15 | B | 12 | A | 85 | 0 | 85 | A | 109 |
| Comparative Example | 3-23 | Moderate-heat | 5 | B | 12 | A | 99 | 0 | 99 | A | 109 |
| Comparative Example | 3-24 | Moderate-heat | 35 | B | 12 | A | 38 | 0 | 38 | A | 128 |
| Comparative Example | 3-25 | Moderate-heat | 25 | B | 25 | — | 0 | 24 | 24 | A | 134 |
| Comparative Example | 3-26 | Moderate-heat | 15 | — | 0 | — | 0 | 78 | 78 | A | 109 |
| Comparative Example | 3-27 | Moderate-heat | 0 | B | 11 | A | 76 | 0 | 76 | A | 134 |
| Comparative Example | 3-28 | Moderate-heat | 4 | B | 11 | A | 70 | 0 | 70 | A | 134 |
| Comparative Example | 3-29 | Moderate-heat | 11 | — | 0 | A | 23 | 18 | 41 | A | 104 |
| Comparative Example | 3-30 | Moderate-heat | 11 | — | 0 | C | 23 | 18 | 41 | A | 104 |
| Comparative Example | 3-31 | Moderate-heat | 13 | — | 0 | C | 28 | 22 | 50 | A | 112 |
| Comparative Example | 3-32 | Moderate-heat | 13 | — | 0 | A | 34 | 27 | 61 | A | 121 |
| Comparative Example | 3-33 | Moderate-heat | 13 | B | 19 | A | 40 | 31 | 71 | A | 67 |
| Comparative Example | 3-34 | Moderate-heat | 10 | B | 10 | A | 27 | 14 | 41 | A | 155 |

Mix Proportion (parts by weight for 100 parts by weight of cement)

The purpose of setting the mix proportions to those shown in Table 4 is: i) to reveal the assessment in the case where the type of cement is fixed to moderate-heat Portland cement, and each content of silica fume, limestone powder, blast furnace slag and/or fly ash, and aggregate for 100 parts by weight of cement are is set outside a specified upper limit or a specified lower limit; ii) to reveal that the advantageous effect of the invention of the present cementitious matrix is maintained even when the Blaine specific surface area of limestone powder is changed within the range of a specified value; and iii) to reveal that the advantageous effect of invention of the present cementitious matrix is maintained even when the Blaine specific surface area of ground blast furnace slag is changed within the range of a specified value.

[Test Results]

Table 5 and Table 6 show the test results corresponding to the mix proportions shown in Table 3 and Table 4, respectively. Herein, all of the values of the compressive strength, the flexural strength, and the splitting tensile strength (shown as "splitting strength") represent the mean strength determined from the three specimens. The conditions in primary curing and secondary curing are as described in the above [Test Items and Test Methods]. The shrinkage strains are divided into the strain generated during primary curing and the strain generated during secondary curing, and the sum of these strains is used as the final shrinkage strain.

TABLE 5

| Classification | Run Number | Fresh Properties | | After Primary Curing | | After Secondary Curing | | | Strain during Primary Curing × 10⁻⁶ | Strain during Secondary Curing × 10⁻⁶ | Final Strain × 10⁻⁶ |
|---|---|---|---|---|---|---|---|---|---|---|---|
| | | Flow Time Seconds | Flow Value mm | Compressive Strength N/mm² | Flexural Strength N/mm² | Splitting Strength N/mm² | Compressive Strength N/mm² | Flexural Strength N/mm² | | | |
| Example | 1-1 | 12.2 | 256 | 89.5 | 11.3 | 7.56 | 205 | 26.1 | 711 | 330 | 1041 |
| Example | 1-2 | 11.0 | 250 | 85.7 | 10.0 | 10.30 | 202 | 26.8 | 626 | 310 | 936 |
| Example | 1-3 | 12.2 | 263 | 79.5 | 10.4 | 8.62 | 210 | 24.7 | 600 | 300 | 900 |
| Example | 1-4 | 16.0 | 253 | 77.2 | 9.3 | 7.48 | 194 | 23.8 | 540 | 300 | 840 |
| Example | 1-5 | 9.2 | 260 | 84.1 | 9.8 | 8.80 | 210 | 28.0 | 820 | 390 | 1210 |
| Example | 1-6 | 6.4 | 281 | 72.3 | 8.8 | 8.18 | 219 | 24.8 | 751 | 370 | 1121 |
| Comparative Example | 1-7 | 8.8 | 277 | 65.5 | 12.0 | 6.22 | 205 | 22.2 | 1117 | 350 | 1467 |
| Comparative Example | 1-8 | 7.8 | 275 | 75.6 | 11.9 | 9.65 | 211 | 27.4 | 1147 | 380 | 1527 |
| Comparative Example | 1-9 | 9.7 | 263 | 84.7 | 13.5 | 6.25 | 213 | 26.7 | 1142 | 440 | 1582 |
| Comparative Example | 1-10 | 21.0 | 210 | 75.9 | 8.2 | 6.01 | 203 | 22.8 | 490 | 280 | 770 |
| Example | 2-1 | 11.2 | 247 | 82.5 | 10.4 | 8.97 | 206 | 20.0 | 715 | 310 | 1025 |
| Example | 2-2 | 13.6 | 254 | 83.7 | 12.6 | 9.75 | 203 | 20.5 | 706 | 300 | 1006 |
| Example | 2-3 | 11.8 | 253 | 80.5 | 9.7 | 8.52 | 205 | 19.1 | 595 | 320 | 915 |
| Example | 2-4 | 16.1 | 252 | 77.9 | 9.8 | 9.34 | 201 | 19.3 | 531 | 290 | 821 |
| Example | 2-5 | 13.5 | 244 | 84.7 | 11.2 | 10.30 | 199 | 20.1 | 843 | 340 | 1183 |
| Example | 2-6 | 12.3 | 247 | 74.3 | 11.8 | 8.61 | 211 | 21.0 | 721 | 330 | 1051 |
| Comparative Example | 2-7 | 11.4 | 267 | 64.4 | 9.9 | 9.09 | 207 | 17.0 | 1065 | 330 | 1395 |
| Comparative Example | 2-8 | 11.0 | 252 | 74.4 | 10.0 | 9.50 | 213 | 23.4 | 1080 | 360 | 1440 |
| Comparative Example | 2-9 | 10.9 | 250 | 85.2 | 11.0 | 9.40 | 214 | 21.9 | 1222 | 380 | 1602 |
| Comparative Example | 2-10 | 16.9 | 234 | 72.7 | 11.2 | 6.64 | 197 | 18.1 | 483 | 280 | 763 |

TABLE 6

| Classification | Run Number | Fresh Properties | | After Primary Curing | | After Secondary Curing | | | Strain during Primary Curing × 10⁻⁶ | Strain during Secondary Curing × 10⁻⁶ | Final Strain × 10⁻⁶ |
|---|---|---|---|---|---|---|---|---|---|---|---|
| | | Flow Time Seconds | Flow Value mm | Compressive Strength N/mm² | Flexural Strength N/mm² | Splitting Strength N/mm² | Compressive Strength N/mm² | Flexural Strength N/mm² | | | |
| Example | 3-1 | 17.2 | 243 | 63.8 | 10.4 | 8.64 | 213 | 17.5 | 492 | 350 | 842 |
| Example | 3-2 | 13.6 | 257 | 75.3 | 12.0 | 11.40 | 215 | 21.3 | 869 | 390 | 1259 |
| Example | 3-3 | 11.8 | 247 | 78.7 | 10.2 | 10.00 | 216 | 21.5 | 720 | 400 | 1120 |
| Example | 3-4 | 12.7 | 253 | 71.7 | 9.6 | 7.67 | 197 | 17.4 | 645 | 350 | 995 |
| Example | 3-5 | 18.6 | 257 | 80.9 | 12.0 | 10.00 | 205 | 23.1 | 899 | 370 | 1269 |
| Example | 3-6 | 10.4 | 269 | 62.6 | 10.0 | 9.60 | 192 | 20.3 | 413 | 370 | 783 |
| Example | 3-7 | 9.4 | 266 | 72.0 | 13.0 | 8.55 | 197 | 23.8 | 555 | 340 | 895 |
| Example | 3-8 | 9.5 | 263 | 79.8 | 11.5 | 9.61 | 207 | 26.2 | 655 | 360 | 1015 |
| Example | 3-9 | 6.1 | 274 | 65.5 | 10.7 | 8.82 | 198 | 20.0 | 689 | 360 | 1049 |
| Example | 3-10 | 5.3 | 278 | 72.5 | 11.7 | 8.43 | 203 | 22.5 | 615 | 360 | 975 |
| Example | 3-11 | 5.8 | 269 | 82.3 | 12.3 | 9.28 | 206 | 21.3 | 525 | 370 | 895 |
| Example | 3-12 | 7.7 | 270 | 67.5 | 10.6 | 8.05 | 212 | 23.1 | 811 | 414 | 1225 |
| Example | 3-13 | 6.5 | 269 | 65.1 | 10.6 | 8.87 | 198 | 19.0 | 800 | 386 | 1186 |
| Example | 3-14 | 6.5 | 268 | 68.9 | 11.8 | 8.98 | 203 | 20.3 | 756 | 386 | 1142 |
| Example | 3-15 | 9.8 | 255 | 67.3 | 11.3 | 8.65 | 218 | 20.4 | 537 | 350 | 887 |
| Example | 3-16 | 15.7 | 251 | 67.2 | 11.2 | 8.29 | 203 | 18.9 | 505 | 420 | 925 |
| Example | 3-17 | 13.8 | 251 | 75.4 | 9.8 | 8.83 | 215 | 23.4 | 604 | 386 | 990 |
| Example | 3-18 | 15.3 | 258 | 67.7 | 9.8 | 7.93 | 209 | 22.3 | 652 | 364 | 1016 |
| Example | 3-19 | 12.1 | 268 | 71.3 | 10.4 | 8.24 | 205 | 21.4 | 603 | 280 | 883 |
| Example | 3-20 | 6.8 | 267 | 75.8 | 11.3 | 9.71 | 195 | 20.8 | 725 | 348 | 1073 |
| Example | 3-21 | 7.9 | 264 | 62.7 | 9.7 | 8.56 | 209 | 21.7 | 478 | 356 | 834 |
| Comparative Example | 3-22 | Not Measurable | Not Measurable | 74.9 | 10.8 | 6.85 | 208 | 22.8 | 935 | 330 | 1265 |
| Comparative Example | 3-23 | 23.3 | 230 | 90.1 | 11.4 | 9.57 | 223 | 23.6 | 1127 | 370 | 1497 |
| Comparative Example | 3-24 | Not Measurable | 150 | 77.9 | 11.2 | 9.00 | 182 | 21.4 | 1152 | 380 | 1532 |
| Comparative Example | 3-25 | 84.7 | 211 | 64.7 | 8.8 | 6.38 | 199 | 13.5 | 505 | 390 | 895 |

TABLE 6-continued

| Classification | Run Number | Fresh Properties | | After Primary Curing | | After Secondary Curing | | | Strain during Primary Curing $\times 10^{-6}$ | Strain during Secondary Curing $\times 10^{-6}$ | Final Strain $\times 10^{-6}$ |
|---|---|---|---|---|---|---|---|---|---|---|---|
| | | Flow Time Seconds | Flow Value mm | Compressive Strength N/mm$^2$ | Flexural Strength N/mm$^2$ | Splitting Strength N/mm$^2$ | Compressive Strength N/mm$^2$ | Flexural Strength N/mm$^2$ | | | |
| Comparative Example | 3-26 | 25.3 | 236 | 61.0 | 9.5 | 6.29 | 206 | 15.6 | 1252 | 380 | 1632 |
| Comparative Example | 3-27 | 19.3 | 224 | 76.2 | 10.7 | 10.70 | 206 | 25.9 | 860 | 430 | 1290 |
| Comparative Example | 3-28 | 28.8 | 232 | 74.3 | 12.6 | 9.30 | 207 | 23.9 | 935 | 330 | 1265 |
| Comparative Example | 3-29 | 5.4 | 284 | 58.6 | 11.5 | 8.77 | 210 | 18.8 | 951 | 460 | 1411 |
| Comparative Example | 3-30 | 10.8 | 253 | 60.3 | 10.7 | 7.70 | 207 | 20.1 | 826 | 477 | 1303 |
| Comparative Example | 3-31 | 8.9 | 262 | 60.8 | 10.5 | 6.45 | 215 | 23.2 | 905 | 391 | 1296 |
| Comparative Example | 3-32 | 8.2 | 264 | 59.8 | 10.4 | 7.55 | 211 | 20.6 | 1124 | 391 | 1515 |
| Comparative Example | 3-33 | 17.2 | 235 | 68.5 | 11.2 | 8.66 | 197 | 20.5 | 826 | 477 | 1303 |
| Comparative Example | 3-34 | 8.3 | 265 | 58.9 | 8.7 | 6.75 | 202 | 15.3 | 601 | 351 | 952 |

Hereinafter, discussion of test results is given.

(1) In the case where Examples of the series of Run Numbers 1-1 to 1-10 in which moderate-heat Portland cement is employed (Run Number 1-* series) shown in Table 3 is compared with Examples of the series of Run Numbers 2-1 to 2-10 in which ordinary Portland cement is employed (Run Number 2-* series), any difference in the results depending on the type of cement was not significantly observed for the fresh properties, the mechanical properties such as the compressive strength and the flexural strength, and the shrinkage characteristics.

(2) As a result of 54 cases of experiments in total performed according to the mix proportions shown in Table 3 and Table 4, 33 cases of the test results shown in Examples had favorable flow time and flow value, which show fresh properties. On the other hand, among the 21 cases of Comparative Examples, 10 cases (Run Numbers 1-10, 2-10, 3-22 to 3-28, and 3-33) had poor fresh properties.

As the reason, the following points can be considered for 100 parts by weight of cement.

i) In the case where the content of silica fume is larger than the specified upper limit (Run Number 3-24), it is considered that the balance of ground blast furnace slag and fly ash (pozzolanic material) is lost in the mix proportions of powder, and the grading distribution of powder is deviated, as a result, the fresh properties are deteriorated. On the other hand, in the case where the content of silica fume is smaller than the specified lower limit (Run Numbers 3-27, and 3-28), the amount of silica fume, which is dispersed in pores between cement particles and pozzolanic material particles is too small to exert the ball bearing effect.

ii) In the case where the content of limestone powder is larger than the specified upper limit (Run Numbers 1-10 and 2-10), the mixing ratio of silica fume and a pozzolanic material is deteriorated, and as a result, the fluidity is reduced due to the influence of the deviation of grading distribution. On the other hand, even in the case where the content of limestone powder is smaller than the specified lower limit (Run Number 3-26), the fluidity is reduced. However, in other cases where the content of limestone powder is smaller than the specified lower limit, there is a case where the fluidity is satisfied. This is considered that the balance of the silica fume and the mixing ratio of a pozzolanic material is responsible for the fluidity.

iii) In both of the case where the content of blast furnace slag and/or fly ash is larger than the specified upper limit (Run Numbers 3-22, and 3-23) and the case where the content is smaller than the specified lower limit (Run Number 3-25), the fresh properties are reduced. As in the description above, this is considered that the balance of the grading distribution of powder is lost, and as a result, the fluidity is reduced.

iv) In the case where the content of aggregate is smaller than the specified lower limit (Run Number 3-33), the fresh properties are reduced. This is considered that the content of powder component becomes excessive, and as a result, the viscosity is increased, and the fluidity is deteriorated.

(3) It is found that the amount of shrinkage (strain) during curing in the case of Examples in which 5 to 25 parts by weight of limestone powder was mixed with 100 parts by weight of cement (Run Numbers 1-1 to 1-6, 2-1 to 2-6, and 3-1 to 3-21) is smaller than that in the case of Comparative Examples in which the content of limestone powder is shown as zero in the mix proportions (Run Numbers 1-7 to 1-9, 2-7 to 2-9, 3-26, and 3-29 to 3-32). This is because a suitable amount of limestone powder which does not undergo pozzolanic reaction is mixed in addition to a pozzolanic material, and such a combination is features of the present cementitious matrix. Thus, it has been verified that this cementitious matrix can provide more excellent shrinkage reduction effect than that obtained by the mixture of only a pozzolanic material. The shrinkage reduction effect is obtained probably because limestone powder suppresses initial hydration of an aluminate phase ($C_3A$) or a ferrite phase ($C_3AF$) in the primary stage of hydration reaction.

(4) The results in the case of Comparative Examples in which 30 parts by weight of limestone powder was mixed with 100 parts by weight of cement (Run Numbers 1-10 and 2-10) showed significant reduction in the amount of shrinkage. However, from the results of the flow time and the flow value, it can be said that both of Run Number 1-10 and Run Number 2-10, which are Comparative Examples, have poor fresh properties. Moreover, it is found that mechanical properties including splitting tensile strength are also reduced. As the reason, it is considered that limestone powder does not have a role as a binder in the final stage of curing (after secondary curing).

(5) There are 4 types in the Blaine specific surface area of the limestone powder employed in the cases of Examples in which 5 to 25 parts by weight of limestone powder is mixed with 100 parts by weight of cement (Run Numbers 1-1 to 1-6, 2-1 to 2-6, and 3-1 to 3-21), as shown in Table 1. In many cases of the Run Numbers, limestone powder B (the Blaine specific surface area is 9,550 cm$^2$/g) is used. It is revealed that from the test results of Examples for the different Blaine specific surface area of Run Numbers 3-9, 3-11, 3-12, 3-20, and 3-21, as long as the specified upper limit and specified lower limit of each of the mix proportions of powder and the mix proportions of aggregate are satisfied, and if the Blaine specific surface area is 5,000 cm$^2$/g or more, the Blaine specific surface area does not give a significant effect on the test results.

(6) In the mix proportions shown in Table 3 and Table 4, the content of aggregate is 67 to 155 parts by weight for 100 parts by weight of cement. In Run Number 1-7 (128 parts by weight of aggregate) and Run Number 3-26 (109 parts by weight of aggregate) in Comparative Examples, the final shrinkage strain was 1467μ (=×10$^{-6}$) and 1632μ. On the other hand, in Run Number 1-3 (128 parts by weight of aggregate) and Run Number 3-2 (109 parts by weight of aggregate) in Examples, the final shrinkage strain was 900μ, and 1259μ. Further, in Run Number 3-7 (134 parts by weight of aggregate) and Run Number 3-3 (118 parts by weight of aggregate) in Examples, the final shrinkage strain was 895μ and 1120μ. Furthermore, in Run Number 1-1 (128 parts by weight of aggregate) and Run Number 3-5 (118 parts by weight of aggregate) in Examples, the final shrinkage strain was 1041μ and 1269μ. From these results, it is revealed that the amount of shrinkage can be reduced by the increase of the content of aggregate.

(7) In the test results of Run Number 3-33 in which 67 parts by weight of aggregate is mixed with 100 parts by weight of cement, not only the final shrinkage strain is as large as 1303μ but also the content of powder is excessive, and thus the viscosity is high, as a result, the fresh properties are not favorable. On the other hand, in Run Number 3-34 in which the content of aggregate is 155 parts by weight, although the final shrinkage strain becomes as small as 952μ, the content of binder is extremely small, and thus the mechanical strength after primary curing, and the splitting strength and flexural strength after secondary curing are reduced. Further, from the test results of Run Number 3-20 (72 parts by weight of aggregate) and Run Number 3-21 (145 parts by weight of aggregate), the lower limit and upper limit of aggregate are given. Thus, in the present cementitious matrix, the shrinkage is reduced by the mixture of 70 to 150 parts by weight of aggregate having a largest particle diameter Dmax ($D_{100}$), which is a largest aggregate particle diameter, of 1.2 to 3.5 mm for 100 parts by weight of cement, and as a result, the favorable fresh properties and mechanical properties can be obtained.

(8) In Run Number 3-24 in Comparative Example, in which 35 parts by weight of silica fume is mixed with 100 parts by weight of cement, the fresh properties are poor. As the reason, it is considered that the content of blast furnace slag and/or fly ash is reduced by the mixture of a large amount of silica fume having an extremely large specific surface area, as a result, a material having an intermediate particle diameter, which is positioned between the particle diameter of silica fume and the particle diameter of cement, is missing, and thus the densest packing cannot be achieved. Further, it is found that the amount of shrinkage (strain) during primary curing is increased. This is considered because hydration reaction is accelerated in the primary stage of the hydration.

(9) On the other hand, also in Run Number 3-27 and Run Number 3-28 in Comparative Examples, in which 0 or 4 parts by weight of silica fume is mixed with 100 parts by weight of cement, the fresh properties are poor. As the reason, it is considered that the silica fume having a small particle diameter is not mixed in an appropriate amount, and thus the content of blast furnace slag and/or fly ash is increased, as a result, the principle of densest packing by a micro-filler effect of filling the pores of cement particles, ground blast furnace slag, and fly ash particles, cannot be applied.

(10) In Run Number 3-22 in which the content of blast furnace slag and/or fly ash (pozzolanic material) is 85 parts by weight and Run Number 3-23 in which the content of a pozzolanic material is 99 parts by weight for 100 parts by weight of cement in Comparative Example, the fresh properties are poor. As the reason, similar to the reason described in the preceding clause (8), it is considered that in the case where the content of blast furnace slag and/or fly ash (pozzolanic material) is excessively large, a powder having an intermediate particle diameter is excessively increased, and as a result, the densest packing cannot be applied. Moreover, the amount of shrinkage (strain) was also increased. Further, the values of the splitting tensile strength were also smaller than those in Examples.

(11) It is found that in the case of Run Number 3-25 in which 24 parts by weight of blast furnace slag and/or fly ash (pozzolanic material), which is small content, is mixed with 100 parts by weight of cement in Comparative Example, the fresh properties are poor, and further the flexural strength after primary curing and secondary curing, and the splitting tensile strength after secondary curing are smaller as compared with Examples. The poor fresh properties are due to the same reasons as described in the preceding clauses (8) and (9). As the reason why the splitting tensile strength is decreased, it is considered that the amount of a binder excluding cement is reduced by the reduction in the content of a pozzolanic material, and as a result, the tensile strength is reduced.

(12) As to the mix proportion in the pairs of Run Numbers 1-8 and 2-8, 1-1 and 2-1, 1-3 and 2-3, and 1-10 and 2-10, the Blaine specific surface area of ground blast furnace slag is set to 8,470 cm$^2$/g and 6,130 cm$^2$/g, respectively, and each mixing amount of the other powder materials is almost the same as each other. As in the above, each of the pairs of Run Numbers 3-13 and 3-14, 3-32 and 3-31, and 3-29 and 3-30 has a mix proportion in which the Blaine specific surface area of ground blast furnace slag is set to 8,470 cm$^2$/g and 4,590 cm$^2$/g, respectively. From the comparison of the fresh properties, mechanical properties, and the amount of shrinkage of these pairs, it is found that as long as the Blaine specific surface area of ground blast furnace slag is in the preferred range shown in the present embodiment, the fresh properties, the mechanical properties, and the amount of shrinkage are not affected.

(13) As to the mix proportion of Run Numbers 3-11, 3-10, 3-21, and 3-9, the Blaine specific surface area of the limestone powder is set to 15,220 cm$^2$/g, 9,550 cm$^2$/g, 7,330 cm$^2$/g, and 5,110 cm$^2$/g, respectively, and the mix proportion of the powder and the aggregate for 100 parts by weight of cement is almost the same as one another. From the test results shown in Table 6, in which the Blaine specific surface area of limestone powder is an influential factor, it is found that as long as the Blaine specific surface area of limestone powder is in the preferred range, the fresh properties, the mechanical properties, and the amount of shrinkage are not affected.

[Aging Effect of Shrinkage Strain]

In the case where 20 parts by weight of limestone powder is mixed with 100 parts by weight of cement, and in the case where 20 parts by weight of limestone powder is not mixed with 100 parts by weight of cement, the influence on the shrinkage strain is revealed during primary curing and during secondary curing of the cementitious matrix in the present embodiment. Further, in order to investigate the influence on the shrinkage strain, which is caused by the difference of the Blaine specific surface area of limestone powder, the comparison is performed in the case where the Blaine specific surface area is set to 5,110 cm$^2$/g and 9,550 cm$^2$/g.

Figure 1:
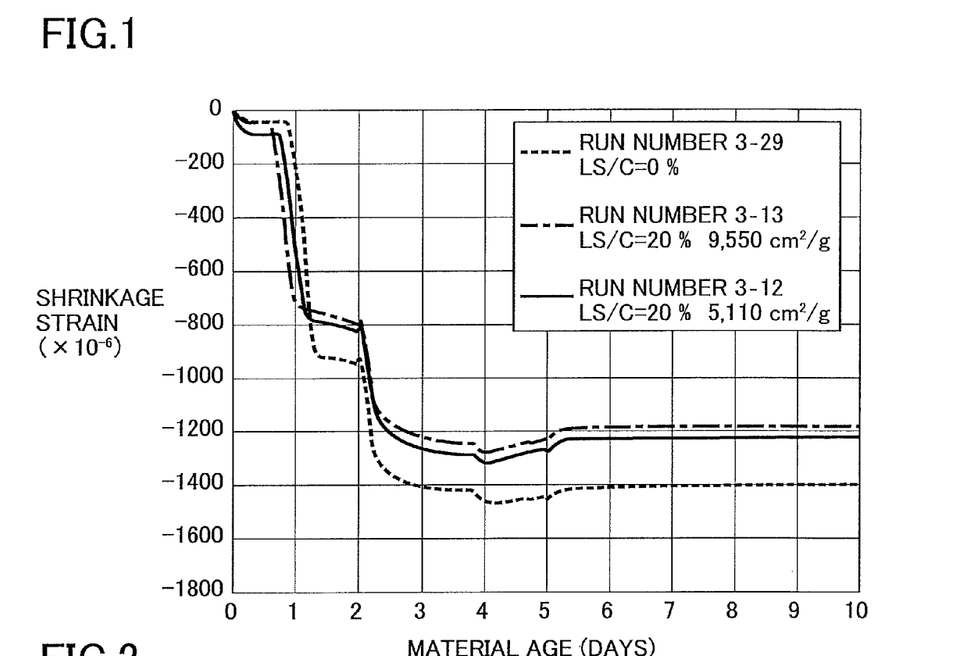
FIG. 1 is a graph showing a relationship between the material age and the shrinkage strain to explain the influence of mixing limestone powder.

FIG. 1 shows the comparison among the case where 20 parts by weight of limestone powder (LS) having a Blaine specific surface area of 5,110 cm$^2$/g is mixed with 100 parts by weight of cement (C) (Run Number 3-12: solid line), the case where 20 parts by weight of limestone powder having a Blaine specific surface area of 9,550 cm$^2$/g is mixed with 100 parts by weight of cement (C) (Run Number 3-13: dashed-dotted line), and the case where the content of limestone powder is substituted with cement without being mixed with 100 parts by weight of cement (C) (0 part by weight of limestone powder) (Run Number 3-29: dashed line).

From the FIG. 1, it is found that the shrinkage strain during primary curing and during secondary curing is reduced by the mixture of limestone powder. In particular, the reduction effect of shrinkage strain is larger during the primary curing. There is no significant difference of the influence of the Blaine specific surface area in limestone powder. However, speaking intentionally, the shrinkage reduction effect of 9,550 cm$^2$/g of the Blaine specific surface area, which is larger, is greater than the shrinkage reduction effect of 5,110 cm$^2$/g of the Blaine specific surface area.

[Aging Effect of Adiabatic Temperature Rise]

Figure 2:
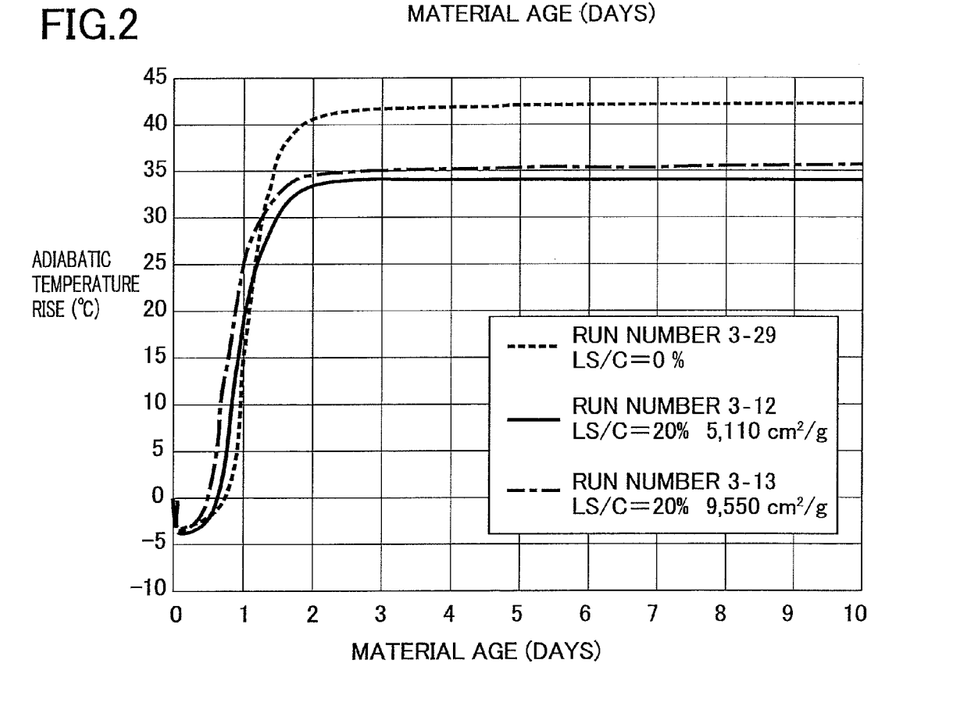
FIG. 2 is a graph showing a relationship between the material age and the adiabatic temperature rise to explain the influence of mixing limestone powder.

As shown in FIG. 2, in order to reveal the reduction effect on the hydration heat temperature rise by limestone powder, a simple adiabatic temperature rise test was performed for the combination of the same mix proportion as in the case of FIG. 1. The results obtained by determining the adiabatic temperature rise from the center temperature obtained by the simple adiabatic temperature rise test and the temperature change outside the formwork, assuming the heat radiation coefficient to be 0.015, are shown in FIG. 2.

From the results shown in FIG. 2, it is found that the adiabatic temperature rise is reduced by the mixture of limestone powder. As the reason, it is considered that the unit cement content that is a heat generating body at hydration reaction can be reduced by the mix proportion of limestone powder.

In addition, in the case where the limestone powder is added, the timing of the temperature rise is earlier as compared in the case where the limestone powder is not added. However, the temperature rise is reversed from the middle, and the adiabatic temperature rise becomes higher in the case where the limestone powder is not added. As the reason why the timing of the temperature rise becomes earlier, it is considered that the limestone powder accelerates the initial hydration of alite ($C_3S$) in cement.

From the above results, it is considered that the influence on the adiabatic temperature rise due to the difference of the Blaine specific surface area of limestone powder is not significant. However, speaking intentionally, it is found that the shrinkage reduction effect of 9,550 cm$^2$/g of the Blaine specific surface area on the adiabatic temperature rise is lower than the shrinkage reduction effect of 5,110 cm$^2$/g of the Blaine specific surface area.

Example 2

Hereinafter, in this Example 2, the results of the tests performed to verify the performance of the ultra-high-strength fiber reinforced concrete described in the above embodiments are described. In addition, the description is provided by giving the same terminology to the portions that are the same as or equivalent to the contents described in the above embodiments or Example 1.

[Materials Used and Mix Proportions]

The powder materials shown in Table 1 of Example 1, and the aggregate shown in Table 2 are used to prepare cementitious matrices having the mix proportions shown in Table 7 below. Further, fibers shown in Table 8 are mixed with a cementitious matrix of each mix proportion to prepare a specimen of an ultra-high-strength fiber reinforced cement based mixture, and by performing a comparison test using the obtained specimen, the validity of the ultra-high-strength fiber reinforced concrete described in the present embodiment is confirmed.

TABLE 7

| | | | Mix Proportion (parts by weight for 100 parts by weight of cement) | | | | | | | |
|---|---|---|---|---|---|---|---|---|---|---|
| | | | | | Ground Blast Furnace Slag and/or Fly Ash | | | | | |
| Classification | Matrix Symbol | Type of Cement | Silica Fume | Limestone Powder | | Ground Blast Furnace Slag | | Fly Ash | Total | Aggregate | |
| Example | M-1 | Moderate-heat | 15 | B | 13 | A | 38 | 20 | 58 | B | 107 |
| Example | M-2 | Moderate-heat | 15 | B | 13 | A | 38 | 20 | 58 | C | 107 |
| Example | M-3 | Moderate-heat | 15 | B | 12 | A | 38 | 20 | 58 | C | 108 |
| Example | M-4 | Moderate-heat | 16 | B | 20 | A | 46 | 18 | 64 | D | 102 |
| Example | M-5 | Moderate-heat | 15 | B | 5 | A | 46 | 21 | 67 | D | 95 |
| Example | M-6 | Moderate-heat | 15 | B | 5 | A | 46 | 21 | 67 | D | 91 |
| Example | M-7 | Moderate-heat | 16 | B | 12 | A | 46 | 18 | 64 | E | 102 |

TABLE 8

| Basic Material | Type of Material | Volume Mixing Ratio % | Density g/cm³ | Tensile Strength mm²/N | Elastic Modulus GPa | Size (mm) Diameter d | Size (mm) Length Li | Aspect Ratio Li/d |
|---|---|---|---|---|---|---|---|---|
| Metallic Fiber | Steel Fiber A | 1.75 | 7.8 | 2,880 | 210 | 0.22 | 18 | 82 |
| | Steel Fiber B | 2.00 | 7.8 | 2,880 | 210 | 0.22 | 18 | 82 |
| | Steel Fiber C | 1.75 | 7.8 | 2,880 | 210 | 0.22 | 20 | 91 |
| | Steel Fiber D | 2.00 | 7.8 | 2,880 | 210 | 0.22 | 20 | 91 |
| | Steel Fiber E | 1.85 | 7.8 | 2,880 | 210 | 0.22 | 18 | 82 |

Moderate-heat Portland cement was employed in all of the 7 kinds of cementitious matrices from the matrix symbols M-1 to M-7 shown in Table 7. Further, these mix proportions are all in the specified range of a cementitious matrix in the present embodiment.

Steel Fiber A to Steel Fiber E shown in Table 8 are all steel fibers, the volume mixing ratio, the length of fibers, or the aspect ratio AR (=Li/d) is changed.

[Test Items and Test Methods]

(1) The flow value and the flow time are the same as in Example 1, therefore, the description is omitted.

(2) Compressive strength: the compressive strength was measured by a method in accordance with "JIS R 1108 (Test method for compressive strength of concrete)". A mixed material of a fiber reinforced cement based mixed material was poured into a formwork having an inner space measuring φ10×20 cm, heated to 35° C. at a heating rate of +10° C./hr as primary curing, maintained at 35° C. for 16 hours, and cooled to 20° C. at a cooling rate of −5° C./hr. Subsequently, the resulting mixed material was heated to 90° C. at a heating rate of +10° C./hr, maintained at 90° C. for 48 hours, and cooled to 20° C. at a cooling rate of −5° C./hr. The resulting hardened specimens were tested and measured for compressive strength (compressive strength after secondary curing). Note that three specimens were prepared in the tests, and the mean value of the strength test was used as the compressive strength data.

(3) Splitting tensile strength: the splitting tensile strength was measured by a method in accordance with "JIS A 1113 (Test method for splitting tensile strength of concrete)". A mixed material of a fiber reinforced cement based mixed material was poured into a formwork having an inner space measuring φ10×20 cm and subjected to the above-described primary curing to obtain a hardened specimen, followed by secondary curing in which the hardened specimen was heated to 90° C. at a heating rate of +10° C./hr, maintained at 90° C. for 48 hours, and cooled to 20° C. at a cooling rate of −5° C./hr. The resulting hardened specimens were tested and measured for splitting tensile strength (splitting tensile strength after secondary curing).

(4) Flexural strength and flexural toughness coefficient: the flexural strength and flexural toughness coefficient were measured by a method in accordance with "JSCE-G 552-2010 (Test method for bending strength and bending toughness of steel fiber reinforced concrete)". A mixed material of a fiber reinforced cement based mixed material was poured into a formwork in a shape of a square column having an inner space measuring φ10×10×40 cm, and subjected to the above-described primary curing to obtain a hardened specimen, followed by secondary curing in which the hardened specimen was heated to 90° C. at a heating rate of +10° C./hr, maintained at 90° C. for 48 hours, and cooled to 20° C. at a cooling rate of −5° C./hr. The resulting hardened specimen was tested and measured for the flexural strength (flexural strength after secondary curing). Note that the flexural toughness coefficient was measured in according with the above test method by performing the measurement of "load-flexure at the center point".

[Test Results]

Table 9 shows the test results obtained by mixing the steel fibers shown in Table 8 into the cementitious matrix shown in Table 7.

TABLE 9

| | | | | Fresh Properties | | After Secondary Curing | | | | |
|---|---|---|---|---|---|---|---|---|---|---|
| Classification | Run Number | Matrix Symbol | Fiber Symbol | Flow Seconds | Flow Value mm | Splitting Strength N/mm² | Compressive Strength N/mm² | Flexural Strength N/mm² | Tensile Strength (Estimate Value) N/mm² | Flexural Toughness N/mm² |
| Example | F-1 | M-1 | A | 10.2 | 254 | 9.7 | 213 | 30.0 | 11.0 | 26.5 |
| Example | F-2 | M-2 | A | 12.1 | 247 | 10.8 | 218 | 33.4 | 12.3 | 29.1 |
| Example | F-3 | M-3 | A | 16.9 | 246 | 9.4 | 219 | 33.7 | 12.4 | 28.6 |
| Example | F-4 | M-4 | A | 14.0 | 245 | 10.1 | 221 | 34.8 | 12.8 | 29.0 |
| Example | F-5 | M-5 | A | 14.0 | 243 | 9.7 | 217 | 34.5 | 12.7 | 28.5 |
| Example | F-6 | M-6 | A | 12.3 | 252 | 9.5 | 215 | 31.4 | 11.5 | 27.1 |
| Example | F-7 | M-7 | A | 15.3 | 239 | 10.1 | 224 | 37.4 | 13.8 | 31.6 |
| Example | F-8 | M-7 | B | 17.8 | 340 | 10.5 | 223 | 37.4 | 13.8 | 31.3 |
| Example | F-9 | M-7 | C | 18.8 | 243 | 10.7 | 232 | 39.0 | 14.5 | 31.4 |
| Example | F-10 | M-7 | D | 14.2 | 239 | 10.1 | 212 | 38.8 | 14.4 | 31.3 |
| Example | F-11 | M-7 | E | 12.2 | 252 | 9.9 | 226 | 33.9 | 12.5 | 29.3 |

The estimate values of the tensile strength shown in Table 9 were estimated from the flexural strength (using a specimen in a shape of a square column of φ10×10×40 cm in size). The tensile strength may be directly determined by a tensile test or may be estimated through inverse analysis from the loadcrack width in a flexural test using a notched test specimen. It is known that there is a strong positive correlation between the flexural strength and the tensile strength, and, this time, the tensile strength was determined from the correlation equation between the flexural strength and the tensile strength determined beforehand.

Hereinafter, the effect of the ultra-high-strength fiber reinforced concrete of the present embodiment, which was obtained from the comparison of test results, is itemized.

(1) From the test results of fresh properties shown in Table 9, it is found that the ultra-high-strength fiber reinforced concrete shows favorable fresh properties in the case where the predetermined volume of fibers are mixed in the cementitious matrix having mix proportions of powder and aggregates, which are shown in the present embodiment and Examples. It is found that the flow time of the ultra-high-strength fiber reinforced concrete in which fibers have been mixed is 10 seconds or more in any cases, and has the viscosity with which fibers can be adequately dispersed.

(2) Run Numbers F-1 to F-7 are combinations of different cementitious matrix for the same Steel Fiber A. From the results shown in Table 9, all of the splitting strength, compressive strength, the flexural strength after the secondary curing show the high strength properties for this kind of material although the volume of fibers mixed is small (the volume mixing ratio is 1.75%). Further, it is found that the flexural toughness coefficient also shows the higher value.

(3) Run Numbers F-7 to F-11 are combinations of different fiber (Steel Fiber A to Steel Fiber E) for the same cementitious matrix (Matrix Symbol M-7). All of the test results show the satisfactory mechanical numerical values. In the case where the Steel Fibers C and D having an aspect ratio AR of 91 are used, the slight increase in the flexural strength can be expected as compared in the case where the Steel Fibers A and B having an aspect ratio AR of 82 are used.

While an embodiment and Examples of the present invention have been described in detail with reference to the drawings, the specific configuration is not limited to the embodiment or the Examples, and the present invention encompasses design changes without departing from the gist of the present invention.

CROSS-REFERENCE TO RELATE APPLICATION

The present application is based upon and claims the benefit of priority from Japanese Patent Application No. 2012-182080 filed on Aug. 21, 2012 in the Japan Patent Office, the disclosure of which is incorporated herein in its entirety by reference.

The invention claimed is:

1. A cementitious matrix comprising:
   100 parts by weight of Portland cement,
   5 to 30 parts by weight of silica fume,
   5 to 25 parts by weight of limestone powder,
   30 to 80 parts by weight of at least one of ground blast furnace slag or fly ash,
   at least one chemical admixture,
   water, and
   70 to 150 parts by weight of aggregate having a largest aggregate diameter of 1.2 to 3.5 mm.

2. The cementitious matrix according to claim 1, wherein a mean particle diameter of the aggregate is 0.17 to 0.8 mm.

3. The cementitious matrix according to claim 1, wherein a Blaine specific surface area of the limestone powder is 5,000 $cm^2/g$ or more.

4. The cementitious matrix according to claim 1, wherein a Blaine specific surface area is 3,000 $cm^2/g$ or more when the ground blast furnace slag is used, and a Blaine specific surface area is 2,500 $cm^2/g$ or more when the fly ash is used.

5. The cementitious matrix according to claim 1, wherein the aggregate has a largest particle diameter $D_{100}$ of 1.2 to 2.5 mm, and a mean particle diameter $D_{50}$ of 0.2 to 0.4 mm.

6. The cementitious matrix according to claim 2, wherein a Blaine specific surface area of the limestone powder is 5,000 $cm^2/g$ or more.

7. The cementitious matrix according to claim 2, wherein a Blaine specific surface area is 3,000 $cm^2/g$ or more when the ground blast furnace slag is used, and a Blaine specific surface area is 2,500 $cm^2/g$ or more when the fly ash is used.

8. The cementitious matrix according to claim 3, wherein a Blaine specific surface area is 3,000 $cm^2/g$ or more when the ground blast furnace slag is used, and a Blaine specific surface area is 2,500 $cm^2/g$ or more when the fly ash is used.

9. The cementitious matrix according to claim 6, wherein a Blaine specific surface area is 3,000 $cm^2/g$ or more when the ground blast furnace slag is used, and a Blaine specific surface area is 2,500 $cm^2/g$ or more when the fly ash is used.

10. The cementitious matrix according to claim 2, wherein the aggregate has a largest particle diameter $D_{100}$ of 1.2 to 2.5 mm, and a mean particle diameter $D_{50}$ of 0.2 to 0.4 mm.

11. The cementitious matrix according to claim 3, wherein the aggregate has a largest particle diameter $D_{100}$ of 1.2 to 2.5 mm, and a mean particle diameter $D_{50}$ of 0.2 to 0.4 mm.

12. The cementitious matrix according to claim 6, wherein the aggregate has a largest particle diameter $D_{100}$ of 1.2 to 2.5 mm, and a mean particle diameter $D_{50}$ of 0.2 to 0.4 mm.

13. The cementitious matrix according to claim 4, wherein the aggregate has a largest particle diameter $D_{100}$ of 1.2 to 2.5 mm, and a mean particle diameter $D_{50}$ of 0.2 to 0.4 mm.

14. The cementitious matrix according to claim 7, wherein the aggregate has a largest particle diameter $D_{100}$ of 1.2 to 2.5 mm, and a mean particle diameter $D_{50}$ of 0.2 to 0.4 mm.

15. The cementitious matrix according to claim 8, wherein the aggregate has a largest particle diameter $D_{100}$ of 1.2 to 2.5 mm, and a mean particle diameter $D_{50}$ of 0.2 to 0.4 mm.

16. The cementitious matrix according to claim 9, wherein the aggregate has a largest particle diameter $D_{100}$ of 1.2 to 2.5 mm, and a mean particle diameter $D_{50}$ of 0.2 to 0.4 mm.

17. A fiber reinforced cement based mixture comprising:
   the cementitious matrix according to claim 1, and
   a fiber in a volume of 0.7 to 8.0% of the total volume.

18. A fiber reinforced cement based mixture comprising:
   the cementitious matrix according to claim 2, and
   a fiber in a volume of 0.7 to 8.0% of the total volume.

19. A fiber reinforced cement based mixture comprising:
   the cementitious matrix according to claim 3, and
   a fiber in a volume of 0.7 to 8.0% of the total volume.

20. A fiber reinforced cement based mixture comprising:
   a cementitious matrix according to claim 4, and
   a fiber in a volume of 0.7 to 8.0% of the total volume.

* * * * *